(12) United States Patent
Hotta

(10) Patent No.: US 12,274,984 B2
(45) Date of Patent: Apr. 15, 2025

(54) EVALUATION METHOD AND EVALUATION DEVICE FOR FORWARD OSMOSIS MEMBRANE MODULE

(71) Applicant: Asahi Kasei Kabushiki Kaisha, Tokyo (JP)

(72) Inventor: Daisuke Hotta, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 479 days.

(21) Appl. No.: 17/851,281

(22) Filed: Jun. 28, 2022

(65) Prior Publication Data
US 2022/0410073 A1 Dec. 29, 2022

(30) Foreign Application Priority Data

Jun. 28, 2021 (JP) ................................. 2021-106800

(51) Int. Cl.
| | | |
|---|---|---|
| *B01D 65/10* | (2006.01) | |
| *B01D 61/00* | (2006.01) | |
| *B01D 63/02* | (2006.01) | |
| *G01N 15/08* | (2006.01) | |

(52) U.S. Cl.
CPC ......... *B01D 65/10* (2013.01); *B01D 61/0023* (2022.08); *B01D 61/005* (2013.01); *B01D 63/02* (2013.01); *G01N 2015/084* (2013.01)

(58) Field of Classification Search
CPC .. B01D 65/10; B01D 61/0023; B01D 61/005; B01D 63/02; G01N 2015/084
See application file for complete search history.

(56) References Cited

U.S. PATENT DOCUMENTS

| 2013/0220927 A1* | 8/2013 | Moody | C02F 1/445 |
| | | | 210/652 |
| 2017/0266625 A1 | 9/2017 | Kiguchi et al. | |
| 2018/0243693 A1* | 8/2018 | Benton | B01D 61/0024 |

(Continued)

FOREIGN PATENT DOCUMENTS

| JP | 2016-016384 A | 2/2016 |
| JP | 2021-016811 A | 2/2021 |
| KR | 10-2013-0140370 A | 12/2013 |

(Continued)

*Primary Examiner* — Jamel E Williams
(74) *Attorney, Agent, or Firm* — Morgan, Lewis & Bockius LLP

(57) ABSTRACT

[PROBLEM] To provide an evaluation method and evaluation device with which the practical performance of a forward osmosis membrane can more accurately be measured.
[SOLVING MEANS] Provided is a method for evaluating a forward osmosis membrane module. The method includes the steps of, in a forward osmosis membrane module having spaces which are partitioned by a forward osmosis membrane including a porous support body and a separation function layer stacked thereon, connecting a feed solution line to a space on the separation function layer side, and connecting a draw solution line to a space on the porous support body side, and moving a solvent in the feed solution into the draw solution via the forward osmosis membrane while adjusting a physical pressure differential across the forward osmosis membrane to a constant value within the range of more than 0 kPa to 200 kPa.

34 Claims, 4 Drawing Sheets

(56) References Cited

U.S. PATENT DOCUMENTS

2021/0339194 A1   11/2021   Hotta et al.

FOREIGN PATENT DOCUMENTS

| WO | 2016/027869 | A1 |   | 2/2016 | | |
|---|---|---|---|---|---|---|
| WO | 2016/167267 | A1 |   | 10/2016 | | |
| WO | 2019/189548 | A1 |   | 10/2019 | | |
| WO | 2020/022218 | A1 |   | 1/2020 | | |
| WO | 2020/050282 | A1 |   | 3/2020 | | |
| WO | WO-2020241860 | A1 | * | 12/2020 | ........... | B01D 61/002 |

* cited by examiner

EVALUATION METHOD AND EVALUATION DEVICE FOR FORWARD OSMOSIS MEMBRANE MODULE

FIELD

The present disclosure relates to an evaluation method and an evaluation device for a forward osmosis membrane module.

BACKGROUND

Among selective separation technologies for liquid mixtures, membrane separation technology is used in a wide range of fields such as seawater desalination, ultrapure water production, wastewater treatment, and the food industry. Though microfiltration membranes, ultrafiltration membranes, nanofiltration membranes, reverse osmosis membranes, etc., are well known as membranes used in membrane separation technology, in recent years, forward osmosis membranes, which can achieve high degrees of concentration that cannot be achieved by reverse osmosis membranes, have attracted attention.

Forward osmosis membranes use the osmotic pressure difference generated through the separation function layer as a driving force to move water from the feed solution to the draw solution by the forward osmosis principle. In general, since the separation function layer is often a thin film, a composite semipermeable membrane in which the separation function layer is laminated and physically supported on a support membrane such as a porous support body or a non-woven fabric is often used as the forward osmosis membrane.

Forward osmosis membranes can be used as a forward osmosis membrane module having an exterior body (module housing) and at least one forward osmosis membrane housed in the exterior body and partitioning the space in the exterior body. Generally, a forward osmosis membrane module is connected to a feed solution line for sending a feed solution containing a solvent into one of the spaces separated by a forward osmosis membrane and to a draw solution line for sending a draw solution having a higher osmotic pressure than the feed solution into the other space, and is then evaluated and put into practical use.

For example, Patent Literature 1 describes a forward osmosis treatment method comprising a forward osmosis step of contacting a feed solution to a draw solution, which has a higher osmotic pressure than the feed solution, via a semipermeable membrane to move water contained in the feed solution into the draw solution. Patent Literature 1 further describes a forward osmosis treatment method wherein the physical pressure differential between the feed solution and the draw solution is adjusted so that in the forward osmosis process, fluctuations in the permeated water amount, which is the amount of water moving from the feed solution to the draw solution, are reduced.

Patent Literature 2 describes a pressure-adjusting forward osmosis device, comprising an inflow water (feed solution) storage tank, a draw solution storage tank for storing a high concentration draw solution, a forward osmosis membrane module, a high-pressure pump which is installed in piping from the inflow water storage tank to the forward osmosis membrane module, and which provides the forward osmosis membrane module with pressure regulated based on external control, and a back pressure valve which is installed in a concentrated water pipe for discharging from the forward osmosis membrane module and which regulates the pressure applied to the forward osmosis membrane module based on the external control.

Patent Literature 3 describes an osmosis membrane module evaluation device which has a structure wherein a high concentration part to which a high concentration side solution (draw solution) is supplied and a low concentration part to which a low concentration side solution (feed solution) is supplied are separated by a semipermeable membrane. The evaluation device comprises a high concentration side solution supply means to the high concentration part, a low concentration side solution supply means to the low concentration part, an electrodialysis device, a reverse osmosis membrane module, a first introduction path for the introduction of a discharge liquid from the high concentration part into the electrodialysis device, a second introduction path for the introduction of a discharge liquid from the low concentration part into the reverse osmosis membrane module, a first reflux path for refluxing concentrate discharged from the electrodialysis device to the solution supply means on the high concentration side, a second reflux path for refluxing permeate discharged from the reverse osmosis membrane module to the solution supply means on the low concentration side, a third introduction path for the introduction of desalting solution discharged from the electrodialysis device into the reverse osmosis membrane module, and a fourth introduction path for the introduction of concentrate discharged from the reverse osmosis membrane module into the electrodialysis device. Patent Literature 3 further describes that the high concentration side solution supply means and the low concentration side solution supply means are each provided with a pressure adjustment means.

Patent Literature 4 describes a method for evaluating the water permeability of a filter membrane comprising a support layer and a separation function layer. The method comprises the steps of immersing the filter membrane in an electrolytic solution, applying an alternating current of one or more frequencies to the electrolytic solution via electrodes arranged on opposite sides in the water permeation direction with the filter membrane interposed therebetween, measuring the impedance between the opposite sides of the filter membrane under the condition that alternating current is applied, applying pressure to the electrolytic solution from one side or the other side of the filter membrane, and evaluating the permeability of the filter membrane based on pressure relaxation characteristics of the impedance corresponding to one or more specific frequencies.

CITATION LIST

Patent Literature

[PTL 1] WO 2020/022218
[PTL 2] Korean Published Patent Application No. 2013-0140370
[PTL 3] Japanese Unexamined Patent Publication (Kokai) No. 2016-16384
[PTL 4] Japanese Unexamined Patent Publication (Kokai) No. 2021-16811

SUMMARY

Technical Problem

In the practical use of the forward osmosis method, the feed solution and draw solution are generally supplied to the forward osmosis membrane module by fluid supply means such as a pump. Thus, regardless of the intention of the user, at the start of operation or during operation, physical pressure is temporarily generated in the direction in which the separation function layer peels from the support membrane. The inventors have discovered that when the physical durability of a forward osmosis membrane is low, such physical pressure may cause the separation function layer to peel from the support membrane or may cause the separation function layer to break, resulting in reduced membrane performance.

However, though the forward osmosis method is a separation method in which the difference in osmotic pressure generated through the separation function layer is used as the driving force, in conventional methods for evaluating forward osmosis membrane modules, the physical pressures of the feed solution and draw solution arranged via a forward osmosis membrane are adjusted so as to be equal. Thus, conventional evaluation methods cannot take into consideration the effect of physical pressure which occurs in the direction peeling the separation function layer from the support membrane in practical use, and thus, cannot accurately evaluate the practical performance of a forward osmosis membrane including a support membrane and a separation function layer.

The present disclosure has been conceived in light of the problems described above, and an object thereof is to provide an evaluation method and evaluation device with which the practical performance of a forward osmosis membrane can more accurately be measured.

Solution to Problem

Examples of embodiments of the present disclosure are listed below.

[1]

A method for evaluating a forward osmosis membrane module having spaces partitioned by a forward osmosis membrane, wherein the forward osmosis membrane has a support membrane comprising a porous support body, and a separation function layer provided on the support body, the method comprising the steps of:

preparing a feed solution line for sending a feed solution containing a solvent to the forward osmosis membrane module, and a draw solution line for sending a draw solution having an osmotic pressure higher than the feed solution to the forward osmosis membrane module, connecting the feed solution line to, among the spaces of the forward osmosis membrane module, a space on the separation function layer side, and connecting the draw solution line to a space on the porous support body side, and flowing the feed solution and the draw solution countercurrently or concurrently via the forward osmosis membrane to move the solvent in the feed solution into the draw solution while adjusting the physical pressure differential across the forward osmosis membrane to a constant value within the range of more than 0 kPa to 200 kPa, with a positive pressure on the porous support body side.

[2]

The method according to Item 1, further comprising, prior to connecting the forward osmosis membrane module to the feed solution line and the draw solution line, adjusting a physical pressure of the draw solution to more than 0 kPa to 200 kPa while circulating the draw solution outside of the forward osmosis membrane module.

[3]

The method according to Item 1 or 2, wherein the physical pressure differential is 20 kPa to 100 kPa.

[4]

The method according to any one of Items 1 to 3, further comprising, prior to connecting the forward osmosis membrane module to the feed solution line and the draw solution line, adjusting a temperature differential of the feed solution and the draw solution to within 10° C.

[5]

The method according to any one of Items 1 to 4, further comprising, prior to connecting the forward osmosis membrane module to the feed solution line and the draw solution line, adjusting flow rates of the feed solution and the draw solution to adjust a difference between a residence time of the feed solution in the space on the separation function layer side and a residence time of the draw solution in the space on the porous support body side after connection of the forward osmosis membrane module to 20 seconds or less.

[6]

The method according to any one of Items 1 to 5, wherein the solvent is water.

[7]

The method according to Item 6, wherein the draw solution is supplied after the feed solution has been supplied to the forward osmosis membrane module.

[8]

The method according to any one of Items 1 to 7, wherein a solution containing the feed solution after having been supplied to the forward osmosis membrane module and discharged from the forward osmosis membrane module is not returned to a feed solution tank.

[9]

The method according to Item 8, wherein performance of the forward osmosis membrane is evaluated by measuring at least one difference selected from the group consisting of conductivity, refractive index, total organic carbon, chemical oxygen demand, biochemical oxygen demand, absorbance, and transmittance between the feed solution and a solution containing the feed solution after having been supplied to the forward osmosis membrane module and discharged from the forward osmosis membrane module, and comparing the difference with that of the draw solution.

[10]

The method according to Item 8 or 9, wherein evaluation is started 10 seconds or more after the feed solution is first discharged from the forward osmosis membrane module.

[11]

The method according to any one of Items 1 to 10, wherein a draw solute contained in the draw solution is at least one selected from inorganic salts and hydrophilic organic compounds.

[12]

The method according to Item 11, wherein a number average molecular weight of the draw solute is 20 to 300.

[13]

The method according to Item 11 or 12, wherein the draw solute comprises a monovalent salt.

[14]

The method according to any one of Items 11 to 13, wherein the draw solute contains a C1-4 alcohol and/or acetonitrile.

[15]
The method according to any one of Items 11 to 14, wherein a concentration of the draw solute

[16]
The method according to any one of Items 1 to 15, wherein the forward osmosis membrane module is a hollow fiber membrane module.

[17]
An evaluation device for a forward osmosis membrane module having a forward osmosis membrane, the device comprising:
- a feed solution tank in which a feed solution is stored, a feed solution line for connecting the feed solution tank to the forward osmosis membrane module,
- a feed solution supply means for supplying the feed solution from the feed solution tank to the forward osmosis membrane module through the feed solution line,
- a draw solution tank in which a draw solution having an osmotic pressure higher than the feed solution is stored,
- a draw solution line for connecting the draw solution tank to the forward osmosis membrane module,
- a draw solution supply means for supplying the draw solution from the draw solution tank to the forward osmosis membrane module through the draw solution line,
- a pressure adjustment means which is installed in the draw solution line and which can physically pressurize the draw solution before, after, and during evaluation of the forward osmosis membrane module, the pressure adjustment means being configured to adjust a physical pressure differential of the draw solution relative to a physical pressure of the feed solution via the forward osmosis membrane to a constant value within the range of more than 0 kPa to 200 kPa, and
- a pressure sensor which is installed in the draw solution line and which can measure the physical pressure of the draw solution.

[18]
The evaluation device according to Item 17, wherein the evaluation device is an evaluation device for a forward osmosis membrane module having a forward osmosis membrane having a support membrane comprising a porous support body and a separation function layer provided on the porous support body.

[19]
The evaluation device according to Item 17 or 18, wherein the draw solution line has a circulation structure which can circulate the draw solution outside of the forward osmosis membrane module prior to connection to the forward osmosis membrane module, and comprises a draw solution bypass line which constitutes a part of the circulation structure of the draw solution line and which can be attached to and detached from the forward osmosis membrane module.

[20]
The evaluation device according to any one of Items 17 to 19, wherein the feed solution line has a circulation structure which can circulate the feed solution outside of the forward osmosis membrane module prior to connection to the forward osmosis membrane module, and comprises a feed solution bypass line which constitutes a part of the circulate structure of the feed solution line and which can be attached to and detached from the forward osmosis membrane module.

[21]
The evaluation device according to any one of Items 17 to 20, wherein at least one selected from a pressure adjustment means and a temperature adjustment means is provided in the feed solution line.

[22]
The evaluation device according to any one of Items 17 to 21, further comprising a temperature adjustment means in the draw solution line.

[23]
The evaluation device according to any one of Items 17 to 22, wherein at least one selected from the group consisting of a pressure sensor, a temperature sensor, a flow rate sensor, a conductivity sensor, and a refractive index sensor is provided in the feed solution line.

[24]
The evaluation device according to any one of Items 17 to 23, wherein at least one selected from the group consisting of a pressure sensor, a temperature sensor, a flow rate sensor, a conductivity sensor, and a refractive index sensor is provided in the draw solution line.

[25]
The evaluation device according to any one of Items 17 to 24, wherein the feed solution tank, the draw solution tank, or both comprise a temperature adjustment means.

[26]
The evaluation device according to any one of Items 17 to 25, wherein the feed solution tank, the draw solution tank, or both comprise at least one selected from the group consisting of a temperature sensor, a conductivity sensor, and a refractive index sensor.

[27]
The evaluation device according to any one of Items 17 to 26, wherein a plurality of sets of the feed solution line and the draw solution line are provided, and a plurality of forward osmosis membrane modules can be evaluated in parallel.

[28]
The evaluation device according to any one of Items 17 to 27, wherein the evaluation device is configured such that a value measured by each of the provided sensors and time are monitored in real time and stored in a database, and a difference between a value of the feed solution, the draw solution, or both at the time of solution circulation before evaluation and a value of the forward osmosis membrane module at the time of evaluation can be detected.

[29]
The evaluation device according to any one of Items 17 to 28, wherein a pressure adjustment means, a pressure sensor, and a flow rate sensor are provided in the feed solution line,
- a flow rate sensor is further provided in the draw solution line,
- the evaluation device further comprises a controller which is connected to the pressure sensor, the flow rate sensor, and the pressure adjustment means, as well as the feed solution supply means and the draw solution supply means in the feed solution line and the draw solution line, and
- the controller is configured to compare the physical pressure differential, flow rates, and minimum flow rates of the feed solution and the draw solution in real time, and is configured to control the pressure adjustment means, the feed solution supply means, and the draw solution supply means so as to maintain a desired physical pressure differential and flow rates which are equal to or greater than the minimum flow rates.

[30]
The evaluation device of Item 29, wherein the evaluation device is configured to maintain a real-time physical pressure differential to within ±1 kPa of the desired physical pressure differential.

[31]
The evaluation device according to Item 29 or 30, wherein the evaluation device is configured to be capable of determining, and controlling in advance, a pressure and flow rate of the draw solution prior to forward osmosis membrane module evaluation by inputting information regarding cross-sectional areas of a feed solution supply part and a draw solution supply part in the forward osmosis membrane module, a desired physical pressure differential, and a desired minimum flow rate of the feed solution.

[32]
The evaluation device according to any one of Items 29 to 31, wherein the controller comprises a processor which is configured to execute a proportional integral differential control algorithm.

[33]
The evaluation device according to any one of Items 17 to 32, wherein the draw solution line and/or the draw solution tank further comprises a concentration adjustment means which can perform at least one of removing solvent from the draw solution, adding high-concentration draw solution to the draw solution, or adding draw solute.

[34]
The evaluation device according to any one of Items 17 to 33, wherein the forward osmosis membrane module is a hollow fiber membrane module.

Advantageous Effects of Invention

According to the present disclosure, there is provided an evaluation method and evaluation device with which the practical performance of a forward osmosis membrane can more accurately be measured.

DESCRIPTION OF EMBODIMENTS

Figure 1:
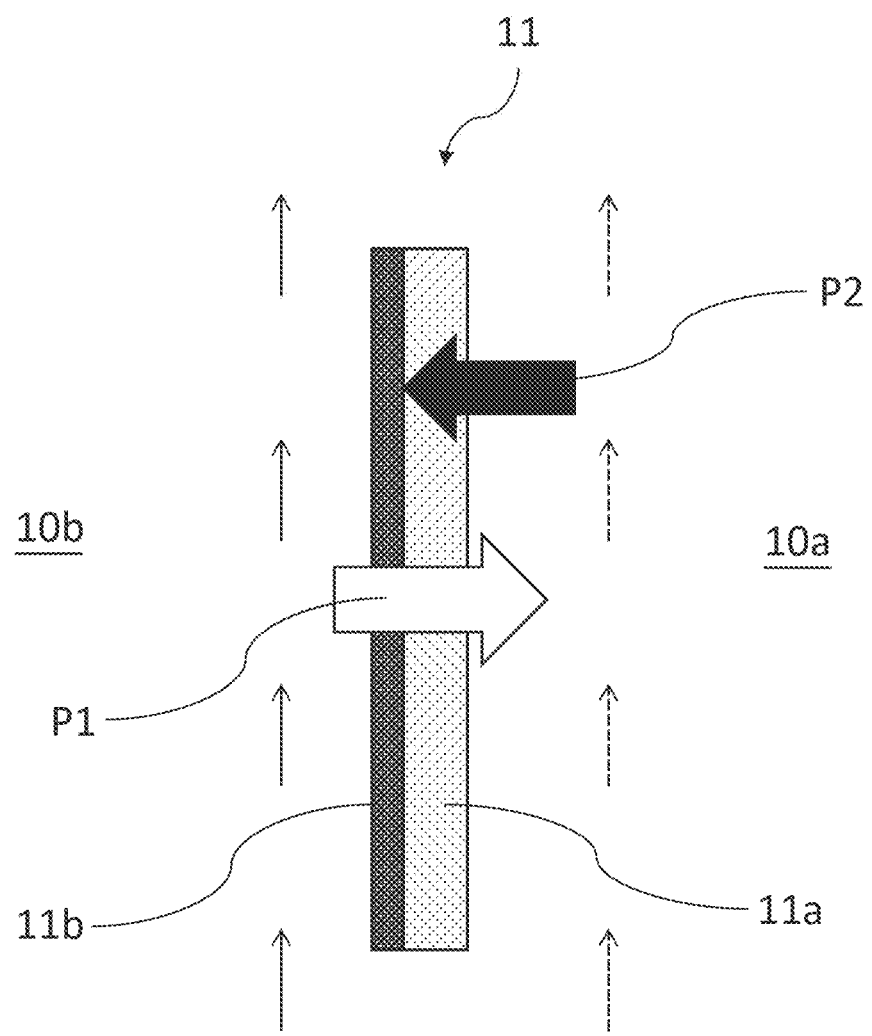
FIG. 1 is a schematic view of a cross section of a forward osmosis membrane in the evaluation method of the present disclosure.

Method for Evaluating Forward Osmosis Membrane Module

The method for evaluating a forward osmosis membrane module of the present disclosure comprises the steps of:
preparing a feed solution line and a draw solution line, connecting the feed solution line and the draw solution line to the forward osmosis membrane module, and
flowing a feed solution and draw solution countercurrently or concurrently via the forward osmosis membrane to move the solvent in the feed solution into the draw solution (hereinafter referred to as the "evaluation step"). In the evaluation step, the performance of the forward osmosis membrane module is evaluated while adjusting the physical pressure differential across the forward osmosis membrane to a constant value within the range of more than 0 kPa to 200 kPa, with a positive pressure on the porous support body side.

In the practical use of the forward osmosis method, the feed solution and draw solution are generally supplied to the forward osmosis membrane module by fluid supply means such as a pump. Thus, regardless of the intention of the user, at the start of operation or during operation, physical pressure is temporarily generated in the direction in which the separation function layer peels from the support membrane. However, though the forward osmosis method is a separation method in which the difference in osmotic pressure generated through the separation function layer is used as the driving force, in conventional methods for evaluating forward osmosis membrane modules, the physical pressures of the feed solution and draw solution arranged via a forward osmosis membrane are adjusted so as to be equal. Thus, conventional evaluation methods cannot take into consideration the effect of physical pressure which occurs in the direction peeling the separation function layer from the support membrane in practical use, and thus, cannot accurately evaluate the practical performance of a forward osmosis membrane including a support membrane and a separation function layer. In connection thereto, in the evaluation method of the present disclosure, by intentionally applying a constant physical pressure differential, the effect of physical pressure which occurs in the direction peeling the separation function layer from the porous support body can be appropriately taken into consideration in the actual use of the forward osmosis membrane module. Thus, the method of the present disclosure can accurately evaluate the practical performance of a forward osmosis membrane including a support membrane and a separation function layer.

<Forward Osmosis Membrane Module>

The forward osmosis membrane module serving as the target for the evaluation method of the present disclosure is a forward osmosis membrane module which has spaces partitioned by forward osmosis membrane, and which has a support membrane comprising a porous support body, and a separation function layer provided on the support body. The spaces in the forward osmosis membrane module include a space on the porous support body side and a space on the separation function layer side. The forward osmosis membrane module may have an exterior body (module housing) in which the forward osmosis membrane is housed.

The forward osmosis membrane has a support membrane having a support membrane comprising a porous support body and a separation function layer provided on the porous support body. The support membrane may be a composite body of a substrate and a porous support body, preferably does not have a substrate, and more preferably is composed of only a porous support body. When the support membrane does not have a substrate, or when it is composed of only a porous support body, since the solution can easily diffuse in the support membrane, it is easy to maintain a high osmotic pressure across the forward osmosis membrane, and from this viewpoint, the water permeability of the forward osmosis membrane tends to be enhanced, and the effect of the evaluation method of the present disclosure is more remarkable because the mechanical strength of the forward osmosis membrane is low and the separation function layer tends to more easily peel from the porous support body.

The substrate plays a role of imparting strength to the porous support body and/or the separation function layer, and is preferably porous so as to allow water to pass therethrough. The substrate generally does not have a separation function, but may have a separation function for solid substances such as particles. Examples of the material of the substrate include polymers such as polyesters, polyamides, polyolefins, and mixtures and copolymers thereof. Examples of the form of the substrate include woven fabrics, non-woven fabrics, mesh-like nets, and foamed sintered sheets. In general, the substrate is often a porous body having a larger pore diameter than the porous support body or separation function layer. The pore diameter of the substrate is generally 0.1 µm to 100 µm, and more generally, it is evaluated by basis weight and air permeability, and the basis weight is 20 g/m$^2$ to 150 g/m$^2$, and the air permeability measured by the Frazier method (JIS L1096) is 0.5 cc/(cm$^2$×sec) to 30 cc/(cm$^2$×sec). In the present disclosure, the support membrane preferably does not have such a substrate.

The porous support body plays a role in imparting strength to the separation function layer. Though the porous support body may have a separating function for solid substances such as particles, it is preferable that the porous support body substantially not have a separating function for solutes such as ions. The description "substantially not have a separating function for solutes such as ions" includes states in which in the separation function of solutes such as ions, the separation function expressed by the porous support body is lower than the separation function expressed by the separation function layer.

The material of the porous support body is preferably, for example, a resin, and in particular, a thermoplastic resin. Thermoplastic resins are resins which are composed of a chain polymer and which exhibit the property of being deformed or fluidized by an external force when heated. Examples of thermoplastic resins include homopolymers and copolymers such as polysulfone, polyethersulfone, polyvinylidene fluoride, polyketone, polyamide, polyester, cellulose-based polymers, vinyl polymers, polyphenylene sulfide, polyphenylene sulfide sulfone, polyphenylene sulfone, and polyphenylene oxide. Examples of cellulose-based polymers include cellulose acetate and cellulose nitrate, and examples of vinyl polymers include polyethylene, polypropylene, polyvinyl chloride, chlorinated polyvinyl chloride, polyacrylonitrile, and polyvinyl alcohol. Derivatives having arbitrary functional groups in the main chain, side chain, and terminal of these polymers can also be used as the thermoplastic resin. One thermoplastic resin can be used alone or a blend of two or more thereof can be used.

When the support membrane is a composite body of a substrate and a porous support body, from the viewpoint of both water permeation resistance and strength, the thickness of the porous support body is preferably 0.02 mm to 0.10 mm. When the support membrane is composed of only a porous support body, from the viewpoint of strength, the thickness of the porous support body is preferably 0.02 mm to 3.00 mm, and from the viewpoint of both water permeation resistance and strength, it is more preferably 0.10 mm to 1.00 mm, and further preferably 0.15 mm to 0.50 mm. When the support membrane is composed of only a porous support body, the porous support body is preferably in the form of a film, a tube, a hollow fiber, or a chemically or physically deformed form thereof. The porous support body is preferably in a hollow fiber form. In the case of a hollow fiber form, when modularized, the feed solution and draw solution can be spread evenly over the surface of each membrane as compared to sheet-like membranes, whereby the advantage of reduced evaluation variation of the present invention can be further enjoyed, and the size of the evaluation device can be reduced since a large membrane area can be stored in a smaller space.

The separation function layer is arranged on the porous support body of the support membrane, and is substantially responsible for solute separation in the forward osmosis membrane. More specifically, it has a function for separating, from the solvent in the feed solution, a solute such as ions dissolved therein. The characteristics such as composition and thickness of the separation function layer can be set in accordance with the purpose of use of the forward osmosis membrane.

The material of the separation function layer can be, for example, a high molecular weight polymer, an inorganic material, an organic-inorganic hybrid material, or a material thereof containing an arbitrary inorganic or organic compound dispersed or contained therein. One type of material may be used alone in the separation function layer, or two or more types may be used in combination.

The high molecular weight polymer separation function layer is a membrane having substantially separation performance, which preferentially allows solvent to pass but blocks solute. Examples of the high molecular weight polymer separation function layer include polyamide, polyvinyl alcohol, polypiperazine amide, sulfonated polyether sulfone, polypiperazine amide, polyimide, and composite materials thereof. Among these, the material of the separation function layer may be polyamide from the viewpoint of both the separation function and the transparency of the solvent.

The forward osmosis membrane module may comprise one or a plurality of forward osmosis membranes. More specific examples of the form of the forward osmosis membrane module include plate-type modules having a planar forward osmosis membrane, spiral-type modules in which a flat forward osmosis membrane is arranged in a spiral shape around a perforated water pipe, and hollow fiber membrane modules in which hollow fiber-shaped forward osmosis membranes are bundled and arranged. The forward osmosis membrane module is preferably a hollow fiber membrane module. In the case of a hollow fiber membrane module, when modularized, the feed solution and draw solution can be spread evenly over the surface of each membrane as compared to sheet-like membrane modules, whereby the advantage of reduced evaluation variation of the present invention can be further enjoyed, and the size of the evaluation device can be reduced since a large membrane area can be stored in a smaller space.

In hollow fiber membrane modules, in general, a bundle of hollow fiber membranes is affixed in a module housing by an adhesive resin, whereby the space on the porous support body side and the space on the separation function layer side are partitioned from each other. The module housing comprises a feed solution inlet for the introduction of the feed solution, a feed solution outlet for the collection of the feed solution, a draw solution inlet for the introduction of the draw solution, and a draw solution outlet for the collection of the draw solution. Though the size and shape of the module housing are not particularly limited, for example, a cylindrical housing having a diameter of 5 mm to 500 mm and a length of 20 mm to 10,000 mm can be used. As the adhesive resin, for example, a urethane-based adhesive resin or epoxy-based adhesive resin can be used.

<Preparation Step>

The method for evaluating a forward osmosis membrane module of the present disclosure comprises a step wherein a feed solution line for sending a feed solution containing a solvent to the forward osmosis membrane, and a draw solution line for sending a draw solution having an osmotic pressure higher than the feed solution to the forward osmosis membrane are prepared. The feed solution line can preferably collect and circulate the feed solution from the forward osmosis membrane module, and the draw solution line can preferably collect and circulate the draw solution from the forward osmosis membrane module. The case in which each solution is collected and circulated from the forward osmosis membrane module is economical because the amount of each solution used can be reduced. The feed solution line can more preferably circulate the feed solution outside the forward osmosis membrane module prior to connection to the forward osmosis membrane module, and the draw solution line can more preferably circulate the draw solution outside the forward osmosis membrane module prior to connection to the forward osmosis membrane module. Regarding the details of the structures of feed solution line and draw solution line, refer to the section <<Evaluation Device for Forward Osmosis Membrane Module>>, which is described later. By circulating each solution outside the forward osmosis membrane module, the adjustment step, which is described later, can easily be performed, whereby evaluation accuracy immediately after the start of evaluation can be improved.

The feed solution contains a solvent. The feed solution may or may not contain a solute such as ions serving as the separation target. The solvent is preferably water. If the solvent is water, since the membrane is less likely to be damaged beyond acceptable limits, evaluation can be performed more safely and the selective width of the forward osmosis membrane module to be evaluated increases. The feed solution is more preferably purified water.

The draw solution is a solution having a higher osmotic pressure than the feed solution. The draw solution exhibits a high osmotic pressure in practical use as compared to the feed solution containing the substance to be separated or concentrated, and has a function of moving the solvent from the feed solution via the forward osmosis membrane. The draw solution contains the draw solute in a high concentration and thereby has a high osmotic pressure. The concentration of the draw solute is preferably 1 wt % or more relative to the total weight of the draw solution. As a result, the solvent can easily penetrate the separation function layer appropriately and the evaluation time can be shortened, and since the original concentration is high, detection accuracy is suitable. The concentration of draw solute may be more preferably 1 wt % to 10 wt %, and further preferably 1 wt % to 5 wt %.

The draw solute contained in the draw solution is preferably at least one selected from inorganic salts and hydrophilic organic compounds. Examples of inorganic salts include alkali metal salts, alkaline earth metal salts, and ammonium salts. Examples of hydrophilic organic compounds include sugars, monoalcohols, glycols, and water-soluble polymers.

Examples of alkali metal salts include sodium chloride, potassium chloride, sodium sulfate, sodium thiosulfate, and sodium sulfite. Examples of the alkaline earth metal salts include magnesium chloride, calcium chloride, and magnesium sulfate. Examples of ammonium salts include ammonium chloride, ammonium sulfate, and ammonium carbonate. Examples of sugars include general saccharides such as sucrose, fructose and glucose, as well as special saccharides such as oligosaccharides and rare sugars. Examples of monoalcohols include methanol, ethanol, 1-propanol, and 2-propanol. Examples of glycols include ethylene glycol and propylene glycol. Examples of water-soluble polymers include polyethylene oxide and polypropylene oxide, and copolymers of ethylene oxide and propylene oxide. The number average molecular weight of the draw solute is preferably 20 to 300 from the viewpoint that the solvent can appropriately penetrate the separation function layer and the evaluate time can be shortened. Further, it is also preferable that the draw solute contain a monovalent salt because it can be easily detected in accordance with the conductivity and/or refractive index thereof. From the same viewpoint, it is also preferable that the draw solute contain an $C_{1-4}$ alcohol and/or acetonitrile.

<Adjustment Step>

The method for evaluating a forward osmosis membrane module of the present disclosure may comprise an adjustment step in which, prior to the connection step, physical parameters of the feed solution and/or draw solution supplied to the forward osmosis membrane module are adjusted. Examples of the physical parameters include the physical pressure, temperature, and flow rates of the feed solution and/or draw solution. An adjustment step is preferable because the evaluation time is shortened and more accurate evaluation results can be obtained.

The method of the present disclosure preferably further comprises, for example, prior to the connection step, a step in which the physical pressure of the draw solution is adjusted to more than 0 kPa to 200 kPa while the draw solution is circulated outside of the forward osmosis membrane module. By adjusting the physical pressure of the draw solution in advance prior to connecting the draw solution line to the forward osmosis membrane module, the evaluation results of the forward osmosis membrane module are more stable and evaluation can be performed more accurately in a shorter time. From the viewpoint of evaluating accurately in a shorter time, prior to the connection step, the physical pressure of the draw solution is preferably adjusted to 5 kPa to 200 kPa, more preferably 10 kPa to 200 kPa, further preferably 15 kPa to 150 kPa, and particularly preferably 20 kPa to 100 kPa.

The method of the present disclosure preferably further comprises, for example, prior to the connection step, a step in which the temperature differential between the feed solution and the draw solution is adjusted to within 10° C. The temperature differential is preferably within 5° C., more preferably within 3° C., and further preferably within 1° C. By adjusting the temperature differential between the feed solution and the draw solution to a small value prior to the connection step, the individual differences such as the ease of cooling or warming of the feed solution and the draw solution due to the forward osmosis membrane module can be taken into consideration, and in addition, since it is easier to maintain the osmotic pressures of the feed solution and the draw solution more constantly, the values of permeability and salt back diffusion can be stabilized, and the evaluation results of the forward osmosis membrane module are more stable and evaluation can be performed more accurately in a shorter time. The temperature of the feed solution can be adjusted by circulating the feed solution outside the forward osmosis membrane module. Similarly, the temperature of the draw solution can be adjusted by circulating the draw solution outside the forward osmosis membrane module. The temperatures of the feed solution and the draw solution may be ambient temperature, for example, approximately 25±5° C.

The method of the present disclosure preferably further comprises, for example, prior to the connection step, a step in which the flow rates of the feed solution and the draw solution are adjusted. In the flow rate adjustment step, the flow rates of the feed solution and the draw solution are preferably adjusted in advance prior to the connection step so that, after connection of the forward osmosis membrane module, the difference between the residence time of the feed solution in the space on the separation function layer side and the residence time of the draw solution in the space on the porous support body side is within 20 seconds. The difference in residence time is adjusted to be within more preferably 15 seconds, further preferably 10 seconds, even further preferably 5 seconds, and particularly preferably 1 second. By assuming the residence time after connection and adjusting the flow rate in advance prior to the connection, the individual difference of the forward osmosis membrane module can be taken into consideration, the evaluation results of the forward osmosis membrane module can be more stable, and evaluation can be performed more accurately in a shorter time. Furthermore, by reducing the difference in residence time, the concentration rate of the feed solution and the dilution rate of draw solution in the forward osmosis membrane module can easily be controlled, whereby the evaluation results can be made more stable. The flow rate adjustment of the feed solution can be performed while circulating the feed solution outside the forward osmosis membrane module, and likewise, the flow rate adjustment of the draw solution can also be performed while circulating the draw solution outside the forward osmosis membrane module. The residence time of the feed solution may be preferably approximately 1 second to 10 seconds, and more preferably approximately 1 second to 5 seconds. The residence time of the draw solution may also be preferably approximately 1 second to 10 seconds, and more preferably approximately 1 second to 5 seconds. When the residence times of the feed solution and the draw solution are within the ranges of these times, the performance of the forward osmosis membrane can be evaluated more accurately over the entire forward osmosis membrane module without excessive concentration of the feed solution or dilution of the draw solution.

In the flow rate adjustment step, the flow rates of the feed solution and the draw solution are preferably adjusted in advance prior to the connection step so that, after connecting to the forward osmosis membrane module, the difference between the linear velocity of the feed solution in the space on the separation function layer side and the linear velocity of the draw solution in the space on the porous support body side is within 10 cm/sec. The difference in linear velocity is adjusted to be more preferably within 5 cm/sec, and further preferably within 1 cm/sec. By assuming the linear velocities and adjusting the flow rates in advance prior to connection, the individual differences in the forward osmosis membrane module can be taken into consideration, the evaluation results of the forward osmosis membrane module can be more stable, and evaluation can be performed more accurately in a shorter time. The linear velocity of the feed solution may be preferably approximately 1 cm/sec to 10 cm/sec, and more preferably approximately 1 cm/sec to 5 cm/sec. The linear velocity of the draw solution may also be preferably approximately 1 cm/sec to 10 cm/sec, more preferably approximately 1 cm/sec to 5 cm/sec. "Linear velocity" as used herein is the linear velocity on the surface of the forward osmosis membrane. Depending on the form of the forward osmosis membrane module, the residence time can also be adjusted by adjusting the linear velocity.

The flow rates can be adjusted prior to the connect step based on the cross-sectional areas of the feed solution supply part and the draw solution supply part in the forward osmosis membrane module used. The feed solution supply part and the draw solution supply part refer, respectively, to the space in which the feed solution flows and the space in which the draw solution flows in the portion of the forward osmosis membrane module functioning as the forward osmosis membrane (effective membrane area portion). The cross-sectional area is the cross-sectional area in the direction perpendicular to the direction in which the feed solution or the draw solution flows. For example, in the case of a hollow fiber membrane module having a separation function layer on the inner surface thereof, the part which is filled with hollow fiber bundles and which functions as the forward osmosis membrane is the effective membrane area portion, and therewithin, the feed solution supply part corresponds to the inside of the hollow fibers (separation function layer side), and the draw solution supply part corresponds to the outside of the hollow fibers. In the case of a complicated structure in which the cross-sectional area changes depending on the position where the cross-section is taken, calculation may be performed on the portion of the forward osmosis membrane module where the ratio of the same cross-sectional area is the largest in the effective membrane area portion. Though examples of the form of the forward osmosis membrane module include, in addition to a hollow fiber membrane module, a plate module and a spiral module, the flow rate can be adjusted by the same logic based on the cross-sectional area.

Even if the cross-sectional area information of the forward osmosis membrane module is not known, by, as a preliminary experiment, pouring water into the forward osmosis membrane module, adding some sort of dye (for example, brilliant blue) thereto at the same time, and actually measuring the time until the dye is discharged, the relationship between flow rate and residence time can be determined. The flow rates can be adjusted based on the relationship between the flow rate and the residence time in each of the feed solution supply part and the draw solution supply part.

The method of the present disclosure preferably further comprises, prior to the connection step, adjustment of at least one physical parameter selected from the groups consisting of adjustment of physical pressure described above, temperature adjustment, and flow rate adjustment. The adjustment of physical parameters may be controlled in advance prior to the connection step based on the information of the forward osmosis membrane module, feed solution, and draw solution used. The physical parameters determine the pressure and flow rate of the draw solution based on, for example, information on the cross-sectional areas of the feed solution supply part and the draw solution supply part in the forward osmosis membrane module, the desired physical pressure differential, and the minimum flow rate of the desired feed solution, which may be controlled in advance prior to the connect step. As a result, the evaluation results of the forward osmosis membrane module can be more stable, evaluation can be performed more accurately in a shorter time.

<Connection Step>

The method for evaluating a forward osmosis membrane module of the present disclosure comprises a step of connecting the feed solution line to, among the spaces of the forward osmosis membrane module, a space on the separation function layer side, and connecting the draw solution line to a space on the porous support body side. As a result, the feed solution can be sent to the space on the separation function layer side of the forward osmosis membrane module, and the draw solution can be sent to the space on the porous support body side. The feed solution line is preferably connected so that the feed solution can be collected and circulated from the forward osmosis membrane module, and the draw solution line is preferably connected so that the draw solution can be collected and circulated from the forward osmosis membrane module. The feed solution line and the draw solution line can be connected so that the feed solution and the draw solution flow countercurrently or concurrently. Connection for a concurrent flow is preferable because immediately after evaluation, the feed solution and the draw solution are immediately brought into contact via the forward osmosis membrane, whereby the evaluation start time is earlier, and in the case of a device in which the hollow fiber membrane module is installed vertically, air bubbles in the module can easily escape, whereby evaluation can be accurately performed in a shorter time. It should be noted that installing the hollow fiber membrane module vertically is advantageous in that the device size is reduced. Conversely, connection for a countercurrent flow is preferable because the concentrated feed solution and the undiluted draw solution come into contact in the module, and the unconcentrated feed solution and the diluted draw solution come into contact, whereby a high osmotic pressure difference can be maintained throughout the module.

<Evaluation Step>

In the evaluation step, first, the feed solution and the draw solution are flowed countercurrently or concurrently via the forward osmosis membrane. The order in which the feed solution and the draw solution are supplied to the forward osmosis membrane module may be that either the feed solution or the draw solution is supplied first, or the feed solution and the draw solution may be supplied at the same time. In the method of the present disclosure, in the case of forward osmosis evaluation in which the feed solution is supplied to the separation function layer side of the forward osmosis membrane, when the solvent of the feed solution is water, it is preferable to supply the draw solution after supplying the feed solution to the forward osmosis membrane module. Since water does not have osmotic pressure, even if it is supplied to the forward osmosis membrane module before the draw solution, bubbles are less likely to be mixed (so-called "airlocked") in the forward osmosis membrane, in particular, in a thick part of the support membrane of the forward osmosis membrane, whereby evaluation can be performed more easily and accurately. Furthermore, by supplying water first as a feed solution, it is possible to remove air bubbles in the feed solution passage part in the forward osmosis membrane module without adversely affecting the evaluation results, and it is possible to accurately evaluate the water permeability and the amount of salt back diffusion from the initial stage of evaluation.

In the evaluation step, the solvent in the feed solution is moved into the draw solution while adjusting the physical pressure differential across the forward osmosis membrane to a constant value within the range of more than 0 kPa to 200 kPa, with a positive pressure on the porous support body side. By setting the physical pressure differential to 200 kPa or less, excessive damage to the membrane of the forward osmosis membrane module is unlikely to occur, and by setting it to more than 0 kPa, the influence of the physical pressure generated in the direction of peeling of the separation function layer from the porous support body in the actual use of the forward osmosis membrane module can be appropriately taken into consideration. Thus, the practical performance of the forward osmosis membrane including the support membrane and the separation function layer can accurately be evaluated by the method of the present disclosure.

From the viewpoint of more accurate evaluation, the physical pressure differential, with a positive pressure on the porous support body side, is preferably 5 kPa to 200 kPa, more preferably 10 kPa to 200 kPa, further preferably 15 kPa to 150 kPa, and particularly preferably 20 kPa to 100 kPa. However, from the viewpoint of moving the solvent in the feed solution into the draw solution, the physical pressure differential can be less than or equal to the osmotic pressure difference between the feed solution and the draw solution. The physical pressure differential is preferably monitored in real time and maintained, and the real-time physical pressure differential is more preferably maintained within ±1 kPa of the desired physical pressure difference. By maintaining the physical pressure differential in the above range, the diffusivity of the draw solution in the porous support body of the forward osmosis membrane is promoted, whereby the renewal of the draw solution near the separation function layer is further promoted, and since the decrease in water permeability due to pressurization from the draw solution side can be suppressed to a certain level or less, there is little variation in evaluation results (water permeability and salt back diffusion amount), whereby the practical performance can be made more accurate.

The temperature differential between the feed solution and the draw solution in the evaluation step is preferably adjusted to within 10° C. The temperature differential is more preferably within 5° C., further preferably within 3° C., and even further preferably within 1° C. By adjusting the temperature differential to a small value, the evaluation results of the forward osmosis membrane module can be evaluated more stably and more accurately. The temperature of the feed solution and the draw solution may be ambient temperature, for example, approximately 25±5° C.

The flow rates of the feed solution and the draw solution in the evaluation step are preferably adjusted so that the difference between the residence time of the feed solution in the space on the separation function layer side and the residence time of the draw solution in the space on the porous support body side is within 20 seconds. The difference in residence time is adjusted to within more preferably 15 seconds, further preferably 10 seconds, even further preferably 5 seconds, and particularly preferably 1 second. By adjusting the difference in residence time to a small value, the evaluation results of the forward osmosis membrane module can be more stable and more accurate. The residence time of the feed solution may be preferably 1 second to 10 seconds, and more preferably 1 second to 5 seconds. The residence time of the draw solution may also be preferably 1 second to 10 seconds, and more preferably 1 second to 5 seconds.

The flow rates of the feed solution and the draw solution in the evaluation step are preferably adjusted so that the difference between the linear velocity of the feed solution in the space on the separation function layer side and the linear velocity of the draw solution in the space on the porous support body side is within 10 cm/sec. The difference in linear velocity is more preferably adjusted to be within 5 cm/sec, and further preferably within 1 cm/sec. By adjusting the difference in linear velocity to a small value, the evaluation results of the forward osmosis membrane module can be more stable and more accurate. The linear velocity of the feed solution may be preferably 1 cm/sec to 10 cm/sec, and more preferably 1 cm/sec to 5 cm/sec. The linear velocity of the draw solution may also be preferably 1 cm/sec to 10 cm/sec, and more preferably 1 cm/sec to 5 cm/sec. By appropriately reducing the linear velocity, it is possible to prevent the evaluation from causing damage to the membrane itself. By increasing the linear velocity moderately, over-concentration of feed solution and over-dilution of draw solution due to retention of each solution in the forward osmosis membrane module are suppressed, and it becomes easy to evaluate under certain conditions, whereby the evaluation results can easily be stabilized.

In the evaluation step, the solution containing the feed solution supplied to the forward osmosis membrane module and discharged from the forward osmosis membrane module (hereinafter referred to as the "supplied feed solution") may be circulated and directly returned to the feed solution tank, indirectly returned to the feed solution tank with other processing, or used in one pass and not returned to the feed solution tank. In the circulation case, the amount of reverse diffusion of the draw solute can be managed and evaluated with one feed solution tank in one evaluation of one forward osmosis membrane module, whereby the amount of salt back diffusion of the forward osmosis membrane module can be evaluated with higher accuracy. In the case of indirect return, for example, the feed solution containing trace amounts of salts may be desalted and ultimately returned to the feed solution tank. In the case of one-pass type, since fluid can be supplied to a plurality of modules at the same time from one feed solution tank, and a draw solute is not mixed in the feed solution tank even after forward osmosis evaluation (the feed solution tank is not contaminated), the time can be shortened when performing multiple evaluations.

In the case of one-pass type, the differential of at least one selected from the conductivity, refractive index, total organic carbon (TOC), chemical oxygen demand (COD), biochemical oxygen demand (BOD), absorbance, and transmittance of the feed solution and the supplied feed solution is measured, and the same is compared with the draw solution, whereby the performance of the forward osmosis membrane can be easily evaluated without contaminating the feed solution tank. For example, by measuring the differential of the conductivity of the feed solution between the forward osmosis membrane module inlet side and the forward osmosis membrane module outlet side over time, the amount of salt which has moved in the one-pass type can be estimated. By measuring differentials such as total organic carbon (TOC), chemical oxygen demand (COD), and biochemical oxygen demand (BOD) over time, the amount of organic matter which has moved in the one-pass type can be estimated. By measuring the differential of absorbance over time, the amount of absorbent substance (for example, a dye, an aromatic compound, or a compound having a conjugated bond) which has moved in the one-pass type can be estimated. By measuring the differential of transmittance over time, the amount of fine particles and crystalline substances which have moved in the one-pass type can be estimated. The one-pass type is preferable in at least one evaluation selected from the group consisting of conductivity, refractive index, and absorbance from the viewpoint of easy evaluation and reduced variation. These measurements may be used alone or in combination of two or more from the viewpoint of improving evaluation accuracy. The physical property measurement of the supplied feed solution described above may be performed at any stage after discharge from the forward osmosis membrane module. For example, the supplied feed solution discharged in the one-pass type may be collected in a tank different from the feed solution tank, and the physical properties of the collected supplied feed solution may be directly measured.

In the case of the one-pass type, it is preferable to start evaluation 10 seconds or more after the feed solution is supplied to the forward osmosis membrane module and is discharged the forward osmosis membrane module. More specifically, it is preferable that the feed solution not be used for evaluation, for example, be continuously discharged, for 10 seconds from 0 seconds at which the feed solution starts to be discharged from the forward osmosis membrane module. In other words, it is preferable that the evaluation results not be used for evaluation for a stabilization time of at least 10 seconds, and the measured values thereafter be subjected to evaluation. When there is a stabilization time, it is possible to evaluate the supplied feed solution while avoiding fluctuations in the properties of the feed solution, which may be seen in the early stage of the forward osmosis membrane, in particular in the one-pass method, whereby evaluation can be performed with high accuracy. The evaluation time is preferably 30 seconds or more, and more preferably 1 minute or more, and from the viewpoint of reducing evaluation time, it is preferably 30 minutes or less, more preferably 20 minutes or less, further preferably 10 minutes or less, and even further preferably 5 minutes or less.

In the evaluation step, at least one physical parameter selected from the group consisting of the physical pressure differential, temperatures, flow rates, minimum flow rates, conductivities, and refractive indexes of the feed solution and the draw solution may be monitored in real time and maintained. For example, the physical pressure differential, flow rates, and minimum flow rates of the feed solution and draw solution are preferably monitored in real time, and the desired physical pressure differential of the feed solution and draw solution, and a flow rate equal to or higher than the minimum flow rate is maintained. As a result, each physical parameter is stable, hunting is small, and more accurate evaluation is possible. The control is preferably performed by a proportional integral differential control (PDI control) algorithm because there is less hunting and more accurate evaluation is possible.

As the performance of the forward osmosis membrane module which can be evaluated by the method for evaluating a forward osmosis membrane module of the present disclosure is, for example, salt back diffusion amount (RSF) $(g/(m^2 \times hr))$, water permeability (Flux) $(kg/(m_2 \times hr))$, and salt permeability (RSF/Flux) (g/kg) obtained by dividing RSF by Flux.

RSF means the amount of a draw solute moved across the forward osmosis membrane from the draw solution into the feed solution when the feed solution to be concentrated is flowed on the separation function layer side and the draw solution having a higher osmotic pressure is arranged on the support membrane side. RSF is defined by the following formula (1).

$$RSF = G/(M \times H) \qquad \text{formula (1)}$$

In the formula, G is the amount of the draw solute transferred (g), M is the effective membrane area of the forward osmosis membrane $(m^2)$, and H is time (hr). The membrane area on the side where the separation function layer is arranged is used as the effective membrane area. The lower the RSF, the more preferable. When the RSF is excessively large, problems occur such as the draw solute in the draw solution is mixed in the feed solution, or the solute in the feed solution is mixed in the draw solution, the purity of the feed solution concentrate decreases, the component balance is lost, the draw solution is contaminated, and the components in the draw solution decrease over time.

Flux means the amount of solvent (primarily water) which moves across the forward osmosis membrane from the feed solution into the draw solution when the feed solution to be concentrated is flowed on the separation function layer side and the draw solution having a higher osmotic pressure is arranged on the support membrane side. Flux is defined by the following formula (2).

$$\text{Flux} = L/(M \times H) \qquad \text{formula (2)}$$

In the formula, L is the amount of permeated solvent (kg), M is the effective surface area (m$^2$) of the forward osmosis membrane, and H is the time (hr). The membrane area on the side where the separation function layer is arranged is used as the effective membrane area. The higher the Flux, the more preferable from the viewpoint of achieving highly efficient solvent movement.

RSF/Flux is an index showing the selectivity of salt permeation over solvent permeation, and the lower it is, the more unlikely it is that the salt will permeate and the more likely it is that the solvent will permeate, which is preferable.

In the method for evaluating a forward osmosis membrane module of the present disclosure, by providing a physical pressure differential across the membrane and performing forward osmosis evaluation, performance as a forward osmosis membrane can be evaluated in consideration of physical durability. When the physical durability of the forward osmosis membrane is low, this physical pressure differential cannot be withstood, a part of the separation function layer peels off from the porous support body, and the separation function layer becomes cracked, whereby it changes irreversibly, the draw solution easily penetrates to the feed solution side, and the values of RSF and RSF/Flux become significantly greater than those in the case of evaluation at a physical pressure differential of 0 kPa. Even if the forward osmosis membrane is physically durable and does not undergo irreversible changes, the physical pressure from the draw solution side generally makes it easier for the draw solution to pass through, and the values of RSF and RSF/Flux are often greater than in the case of evaluation with a physical pressure differential of 0 kPa. Thus, the values of RSF and RSF/Flex in practical use can accurately be evaluated with the method of the present disclosure.

Evaluation Device for Forward Osmosis Membrane Module

The evaluation device for a forward osmosis membrane module of the present disclosure comprises a feed solution tank, a feed solution line, a feed solution supply means, a draw solution tank, a draw solution line, a draw solution supply means, a pressure adjustment means installed in the draw solution line, and a pressure sensor installed in the draw solution line. The forward osmosis membrane module to be evaluated is a forward osmosis membrane module having a forward osmosis membrane, and preferably, is a forward osmosis membrane module having a forward osmosis membrane comprising a support membrane having a porous support body and a separation function layer provided on the porous support body. The forward osmosis membrane module is more preferably a hollow fiber membrane module. For details on the forward osmosis membrane module, refer to the section <Forward Osmosis Membrane Module> in <<Method for Evaluating Forward Osmosis Membrane Module>> above.

<Feed Solution Tank and Draw Solution Tank>

The feed solution tank contains the feed solution and the draw solution tank contains the draw solution. The feed solution tank and/or the draw solution tank may comprise a stirrer. It is preferable that the feed solution tank, the draw solution tank or each thereof have a temperature adjustment means capable of adjusting the temperature of the feed solution or draw solution. By providing the feed solution tank and/or the draw solution tank with temperature adjustment means, the individual differences such as the ease of cooling or warming of the feed solution and draw solution due to the forward osmosis membrane module can be taken into consideration. The evaluation results of the forward osmosis membrane module are more stable and evaluation can be performed more accurately in a shorter time.

The feed solution tank, draw solution tank, or both preferably further comprise at least one selected from the group consisting of a temperature sensor, a conductivity sensor, and a refractive index sensor which is capable of measuring the temperature, conductivity, or refractive index, respectively, of the feed solution or draw solution. By providing the feed solution tank and/or the draw solution with these sensors, it becomes easier to compare and control each measured value in real time.

<Feed Solution Line>

The feed solution line connects the feed solution tank to the forward osmosis membrane module, and is preferably configured such that the feed solution can be supplied through the feed solution line from the feed solution tank to the forward osmosis membrane module by the feed solution supply means. The feed solution supply means may be, for example, a pump (hereinafter, also referred to as "feed solution supply pump"). It is preferable that the feed solution line be further configured so that the feed solution can be collected from the forward osmosis membrane module, returned to the feed solution tank, and circulated again to the forward osmosis membrane module.

The feed solution line has a circulation structure which enables circulation of the feed solution outside the forward osmosis membrane module before connection to the forward osmosis membrane module, and may comprise a feed solution bypass line which constitutes a part of the circulation structure of the feed solution line and can be attached to and detached from the forward osmosis membrane module. The bypass line is a line which can circulate each liquid without passing through the forward osmosis membrane module. Since the feed solution line has a circulation structure outside the forward osmosis membrane module, it is easier to adjust the physical pressure, temperature, flow rate, and other physical parameters of the feed solution before connection to the forward osmosis membrane module. Furthermore, by providing a feed solution bypass line, it is possible to connect the flow of the feed solution, the physical parameters of which have been adjusted, to the forward osmosis membrane module, whereby more accurate evaluation can be performed in a shorter time. The bypass line may have any structure as long as it can circulate the solution outside the forward osmosis membrane module, and for example, by branching the forward osmosis membrane module and the bypass line and connecting them in parallel, the solution can be circulated outside the forward osmosis membrane module through the bypass line while sealing the forward osmosis membrane module side with a valve, etc., so that the solution does not flow. After circulating the solution in the bypass line, the solution can be provided to the forward osmosis membrane module by sealing the bypass line side and opening the forward osmosis membrane module side.

The feed solution line preferably comprises a pressure adjustment means installed in the feed solution line. The pressure adjustment means in the feed solution line can assist the adjustment of the physical pressure differential of the feed solution and draw solution to a constant range of more than 0 kPa to 200 kPa via the forward osmosis membrane. By providing the feed solution line with a circulation structure, it is more preferred that the pressure adjustment means be configured to be capable of adjusting the physical pressure of the feed solution before, after, and during evaluation of the forward osmosis membrane module. Examples of the pressure adjustment means include a valve (also referred to as a "pressure regulation valve"), a back pressure valve, pressurization by a pump, and combinations thereof.

The feed solution line preferably comprises a temperature adjusting means installed in the feed solution line. The temperature adjusting means in the feed solution line can assist the adjustment of the temperature differential of the feed solution and draw solution to within 10° C. It is more preferable that the feed solution line have a circulation structure so that the temperature adjusting means can adjust the temperature of the feed solution before, after, and during the evaluation of the forward osmosis membrane module. Examples of temperature adjusting means include a double tube heat exchanger, a temperature control chiller, a heater, etc.

The feed solution line preferably further comprises, installed in the feed solution line, at least one selected from the group consisting of a pressure sensor, a temperature sensor, a flow rate sensor, a conductivity sensor, and a reflective index sensor which can measure the physical pressure, temperature, flow rate, conductivity, or reactive index, respectively, of the feed solution. By providing the feed solution line with these sensors, it is easier to control each physical parameter of the feed solution, whereby more accurate evaluation is possible in a shorter time. These sensors may be arranged either before or after the forward osmosis membrane module, or both before and after.

<Draw Solution Line>

The draw solution line connects the draw solution tank to the forward osmosis membrane module, and may be configured such that the draw solution can be supplied from the draw solution tank to the forward osmosis membrane module through the draw solution line by the draw solution supply means. The draw solution supply means may be, for example, a pump (hereinafter, also referred to as "draw solution supply pump"). The draw solution line is preferably further configured such that the draw solution can be collected from the forward osmosis membrane module, returned to the draw solution tank, and supplied (circulated) again to the forward osmosis membrane module.

The draw solution line more preferably has circulation structure with which the draw solution can be circulated outside the forward osmosis membrane module before connection to the forward osmosis membrane module, and comprises a draw solution bypass line which constitutes a part of the circulation structure of the draw solution line and which can be attached to and detached from the forward osmosis membrane module. By providing the draw solution line with a circulation structure outside the forward osmosis membrane module, it is easier to adjust the physical pressure, temperature, flow rate, and other physical parameters of the draw solution before connection to the forward osmosis membrane module. Furthermore, by providing a draw solution bypass line, it is possible to connect the flow of draw solution, the physical parameters of which have been adjusted, to the forward osmosis membrane module, whereby evaluation can be performed with higher accuracy in a shorter time. Other advantages are the same as the feed solution bypass line.

The draw solution line comprises a pressure adjustment means which is installed in the draw solution line and with which the draw solution can be physically pressurized before, after, and during evaluation of the forward osmosis membrane module. The pressure adjustment means is configured to adjust the physical pressure differential of the draw solution to the physical pressure of the feed solution to be constant within the range of more than 0 kPa to 200 kPa via the forward osmosis membrane. The draw solution line further comprises a pressure sensor which is installed in the draw solution line and which can measure the physical pressure of the draw solution. As a result, it is easier to adjust the physical pressure differential to a constant level. Examples of pressure adjustment means include a valve (also referred to as a "pressure regulation valve"), pressurization by a pump, and a combination thereof.

The draw solution line preferably comprises a temperature adjusting means which is installed in the draw solution line. The temperature adjusting means in the draw solution line can assist the adjustment of the temperature differential of the feed solution and the draw solution to within 10° C. By providing the draw solution line with a circulation structure, the temperature adjusting means is configured so that the temperature of the draw solution can be adjusted before, after, and during evaluation of the forward osmosis membrane module, which is more preferable. Examples of the temperature adjusting means include a double tube heat exchanger, a temperature control chiller, and a heater.

The draw solution line preferably further comprises, in the draw solution line, at least one selected from the group consisting of a temperature sensor, a flow rate sensor, a conductivity sensor and a refractive index sensor which can measure the temperature, flow rate, conductivity, or refractive index, respectively, of the draw solution. By providing the draw solution line with these sensors, it is easier to control each physical parameter of the draw solution, whereby evaluation can be performed more accurately in a shorter time. These sensors may be arranged either before or after the forward osmosis membrane module, or both before and after.

It is preferable that the draw solution line and/or the draw solution tank further comprise a concentration adjustment means which can perform at least one of removal of a solvent from the draw solution, addition of a high concentration draw solution to the draw solution, or addition of a draw solute. When the draw solution line and/or the draw solution tank has a circulation structure, by providing the draw solution line with a concentration adjustment means, the concentration of the draw solution to be circulated can be efficiently reproduced, whereby more accurate evaluation can be performed. As means for removing the solvent from the draw solution, for example, an evaporation means for evaporating and removing the solvent from the draw solution can be adopted. The evaporation means is preferably a means other than membrane distillation, and may be, for example, a distillation process, a vacuum distillation process, or a natural drying process. The concentration of the draw solute in the high-concentration draw solution may be any concentration as long as it is higher than that of the draw solution diluted through the forward osmosis membrane module, and may be a saturated solution. As a method of adding high-concentration draw solution to the draw solution or adding a draw solute, a solution containing the same or different solute as the draw solute may be added. For example, when the draw solute is NaCl, a method of adding a few drops of a saturated solution of NaCl as the same solute can be adopted. Alternatively, when a 1 wt % aqueous solution of NaCl is used as the draw solution, as a different solute, a method of adding a 10 wt % $MgCl_2$ draw solution having a higher osmotic pressure than NaCl may be used depending on the concentration. In the present disclosure, from the viewpoint of easy analysis of the evaluation results and enabling highly accurate measurement in a shorter time, it is preferable to control the concentration by adding a high concentration draw solution with the same draw solute. As the means for adding a high concentration draw solution, for example, it may be added directly to the tank, or it may be transferred from the tank to another system by a pump, concentrated by an evaporation means or the like, and then returned to the tank.

The evaluation device of the present disclosure comprises at least one set of feed solution line and draw solution line, preferably a plurality of sets, whereby a plurality of forward osmosis membrane modules can be evaluated in parallel. When multiple sets of feed solution lines and draw solution lines are provided, the evaluation efficiency is dramatically improved, and it is easy to extract a forward osmosis membrane module having inferior performance from the plurality of forward osmosis membrane modules.

<Controller>

The evaluation device of the present disclosure is preferably configured to monitor the measured value and time in real time with each sensor including the pressure sensor installed in the draw solution line and save the same in the database, and be capable of detecting the difference between the value of the feed solution and/or the draw solution at the time of solution circulation prior to evaluation and the value of forward osmosis membrane module evaluation time. As a result, as will be described later, physical parameters of the feed solution and draw solution can be monitored in real time and configured to maintain them, allowing for more accurate evaluation.

The evaluation device of the present disclosure further comprises a controller, and the controller may be configured to monitor and maintain in real time at least one physical parameter selected from the group consisting of the physical pressure differential, temperatures, flow rates, minimum flow rates, conductivities, and refractive indexes of the feed solution and the draw solution. For example, when a pressure adjustment means, a pressure sensor and a flow rate sensor are provided in the feed solution line, and a flow rate sensor is further provided in the draw solution line, the evaluation device can further comprise a pressure sensor, a flow rate sensor, and a pressure adjustment means in each of the feed solution line and the draw solution line, as well as a controller coupled to the feed solution supply means and the draw solution supply means. Further, the controller is preferably configured to compare the physical pressure differential, flow rates, and minimum flow rates of the feed solution and draw solution in real time. Further, the controller is preferably configured to control the respective pressure adjustment means, feed solution supply means, and draw solution supply means so as to maintain the desired physical pressure differential of the feed solution and draw solution and the flow rates above the minimum flow rates. As a result, each physical parameter is stable, there is less hunting, and more accurate evaluation is possible.

When the physical pressure differential is compared in real time, it is preferable that the controller be configured so that the real-time physical pressure differential be maintained within ±1 kPa of the desired physical pressure differential.

The controller may be configured to control at least one of the physical parameters such as physical pressure, temperature, and flow rate of the feed solution and draw solution based on the input of information such as the forward osmosis membrane module, feed solution, and draw solution used. For example, the controller is preferably configured to capable of determining and controlling in advance the pressure and flow rate of the draw solution prior to forward osmosis membrane module evaluation by inputting information regarding the cross-sectional areas of the feed solution supply part and the draw solution supply part in the forward osmosis membrane module, the desired physical pressure differential, and the desired minimum flow rate of the feed solution. As a result, each physical parameter is stable, there is less hunting, and more accurate evaluation is possible.

When controlling physical parameters such as physical pressure differential in real time, the controller preferably comprises a processor configured to execute a proportional integral differential control (PDI control) algorithm. As a result, each physical parameter is stable, there is less hunting, and more accurate evaluation is possible. PID control is a type of feedback control in control engineering, and is a control method in which an input value is controlled by three elements of a deviation between an output value and a target value, an integral thereof, and a derivative. For example, there may be adopted a configuration in which the physical pressure differential, flow rates, and minimum flow rates of the feed solution and draw solution are monitored in real time (output value), and from the deviation between the desired physical pressure differential and the desired flow rates (target values) exceeding the minimum flow rates, the integral thereof, and derivative thereof, the amount of operation (input values) of the respective pressure adjustment means, feed solution supply means, and draw solution supply means are controlled.

Examples of Evaluation Method and Evaluation Device for Forward Osmosis Membrane Module FIG. 1 is a schematic view of a cross-section of a forward osmosis membrane in the evaluation method of the present disclosure. As schematically shown in FIG. 1, for example, in a forward osmosis membrane (11) composed of a porous support body (11a) and a separation function layer (11b), it is assumed that the draw solution is supplied to the space (10a) on the porous support body (11a) side and the feed solution is supplied to the space (10b) on the separation function layer (11b) side. The direction of the dotted arrow indicates the flow direction of the draw solution, and the direction of the solid arrow indicates the flow direction of the feed solution. In FIG. 1, the draw solution is drawn so as to flow concurrently with the feed solution, but it may flow in counterflow (countercurrently). The draw solution and the feed solution contact with each other via the forward osmosis membrane (11), and an osmotic pressure difference is generated. Based on the osmotic pressure difference, the solvent moves from the feed solution into the draw solution in the solvent movement direction (P1). The performance of the forward osmosis membrane module is evaluated while adjusting the physical pressure differential between the draw solution and the feed solution to be constant within the range of more than 0 kPa to 200 kPa in the direction (P2) of the physical pressure arrow, i.e., with a positive pressure (high pressure) on the porous support body side.

Figure 2:
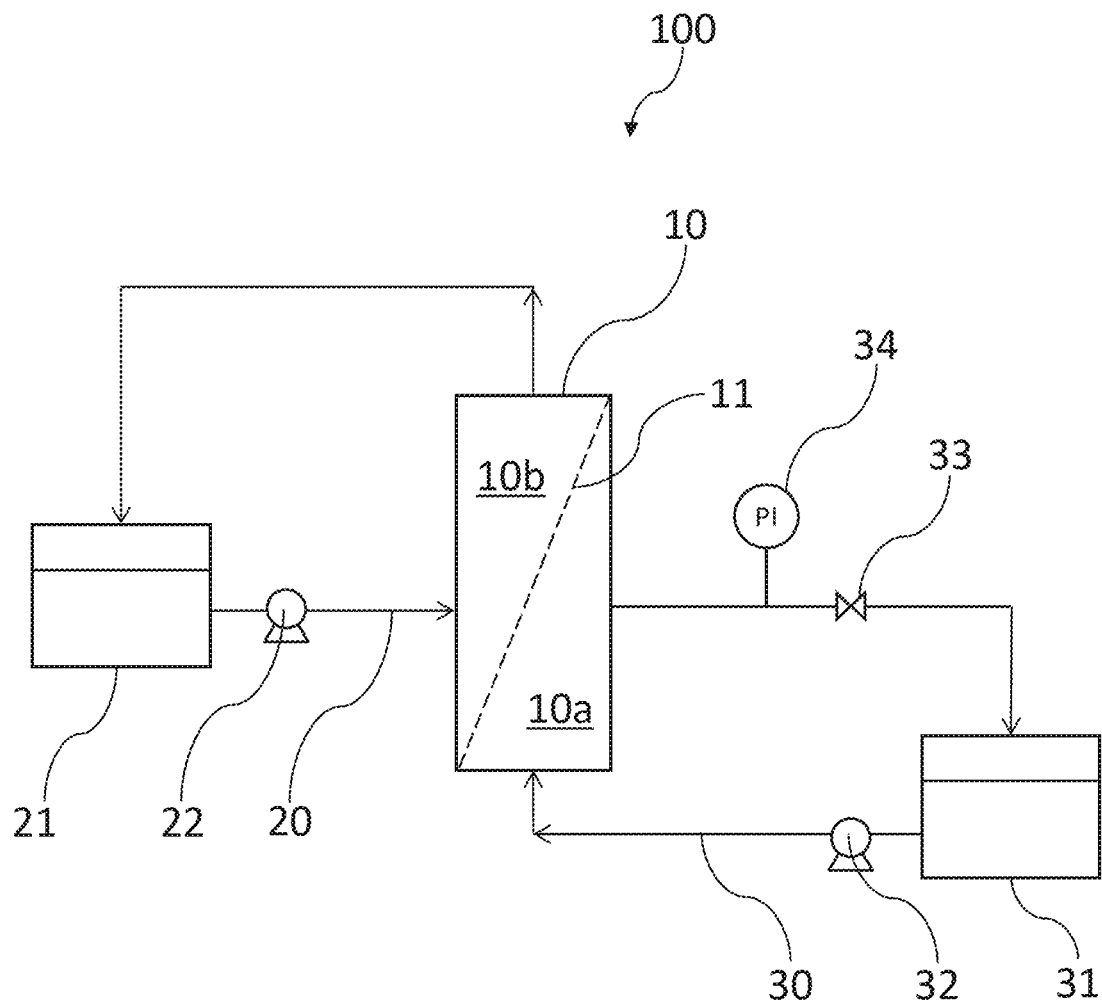
FIG. 2 is a schematic view showing an example of a method for evaluating a forward osmosis membrane module in which the evaluation device of the present disclosure is used.

FIG. 2 is a schematic view showing an example of the method for evaluating a forward osmosis membrane module using the evaluation device of the present disclosure. In FIG. 2, the forward osmosis membrane module (10) comprises a forward osmosis membrane (11) composed of a porous support body and a separation function layer (not illustrated), and the space in the forward osmosis membrane module is partitioned into a space (10a) on the porous support body side and a space (10b) on the separation function layer side by the forward osmosis membrane. A feed solution line (20) and a draw solution line (30) are each prepared. The feed solution line (20) includes a feed solution supply pump (22) as a feed solution supply means for fluid supplying the feed solution from the feed solution tank (21) to the forward osmosis membrane module. The feed solution line (20) is fluid-connected to the space (10b) on the separation function layer side, and the feed solution can be collected from the forward osmosis membrane module, returned to the feed solution tank, and circulated. The draw solution line (30) includes a draw solution supply pump (32) as a draw solution supply means for fluid-supply of the draw solution from the draw solution tank (31) to the forward osmosis membrane module. The draw solution line (30) is fluid-connected to the space (10a) on the porous support body side, and the draw solution can be collected from the forward osmosis membrane module, returned to the draw solution tank, circulated. Furthermore, the draw solution line (30) comprises, in the line in which the draw solution is collected from the forward osmosis membrane module, a pressure regulation valve (33) as a pressure adjustment means for adjusting the physical pressure of the draw solution, and a pressure sensor (34) for measuring the physical pressure of the draw solution. The pressure regulation valve (33) and the pressure sensor (34) connected to a controller (not illustrated), and are configured to compare the physical pressure differential of the feed solution and draw solution in real time, and adjust the physical pressure differential to be constant within the range of more than 0 kPa to of 200 kPa, with a positive pressure on the porous support body side.

Figure 3:
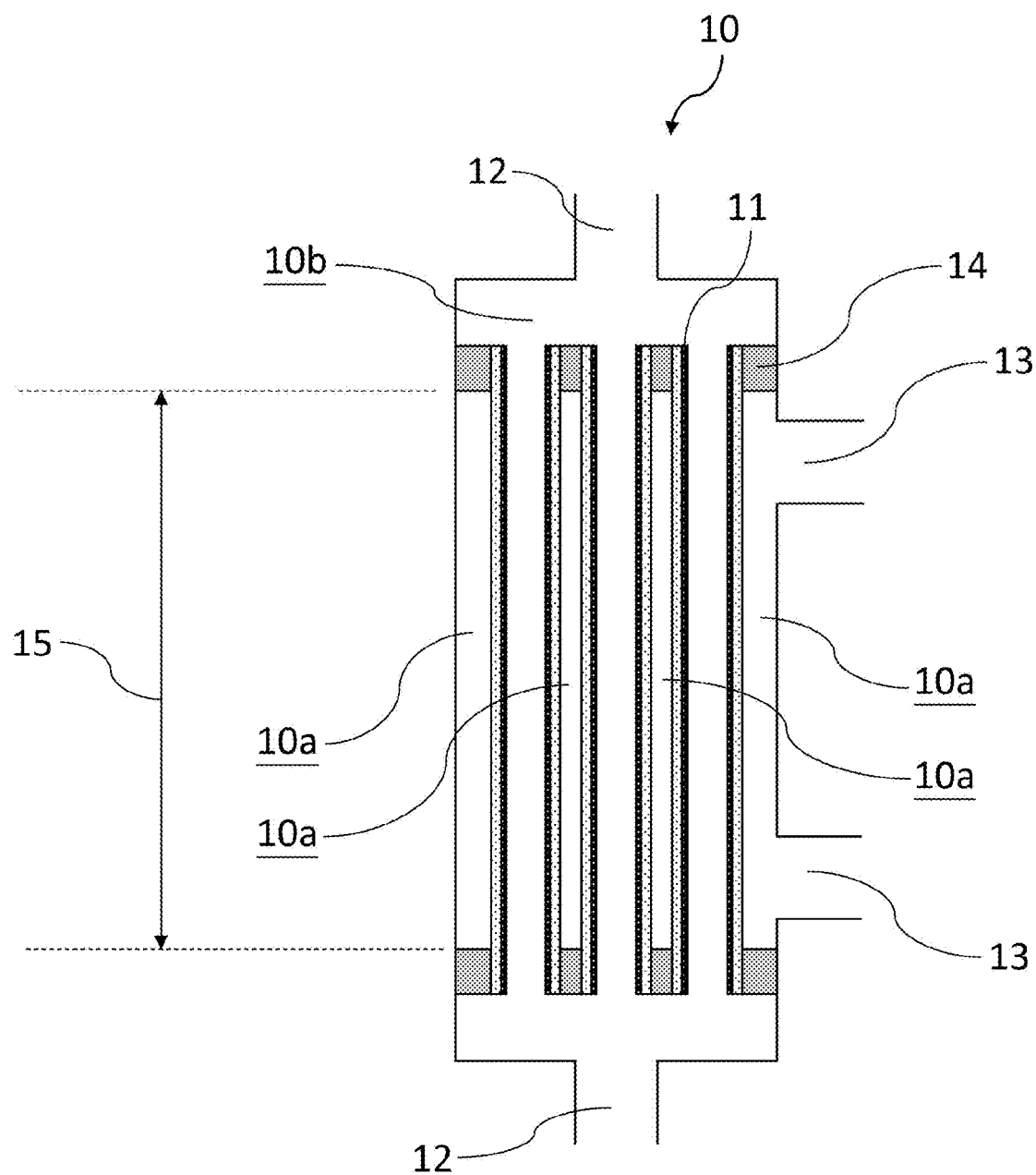
FIG. 3 is a schematic view showing an example of a hollow fiber membrane module.

FIG. 3 is a schematic view showing an example of a hollow fiber membrane module. In FIG. 3, the forward osmosis membrane module (10) is a hollow fiber membrane module including a hollow fiber bundle composing the forward osmosis membrane (11). The hollow fibers of the forward osmosis membrane (11) have a porous support body (corresponding to 11a in FIG. 1) on the outside and a separation function layer (corresponding to 11b in FIG. 1) on the inside. The hollow fiber bundle is arranged in a tubular module housing, and both ends of the hollow fiber bundle are affixed in the module housing by adhesive affixation parts (14). However, each of the adhesive affixation parts (14) is solidified so as not to block the holes at the ends of the hollow fibers. As a result, the space in the module housing is partitioned into a space (10a) on the porous support body (11a) side and a space (10b) on the separation function layer (11b) side. The module housing also has, at the ends thereof, an inner conduit (12) which allows fluid to communicate with the inside of the hollow fibers (i.e., the space (10b) on the separation function layer side), and on the side thereof, an outer conduit (13) which allows fluid to communicate with the outside of the hollow fibers (i.e., the space (10a) on the porous support body side). Through the inner conduit (12), the feed solution can be introduced into the space (10b) on the separation function layer side, and the feed solution can be discharged from the space (10b) on the separation function layer side. Furthermore, the draw solution can be introduced into the space (10a) on the porous support body side through the outer conduit (13), and the draw solution can be discharged from the space (10a) on the porous support body side. The feed solution flowing inside the hollow fibers and the draw solution flowing outside can come into contact only through the hollow fiber membrane. The hollow fiber membrane module has an effective membrane area portion (15) as the portion responsible for the separation function. In FIG. 3, the effective membrane area portion (15) is a portion of the portion filled with the hollow fiber bundle, excluding the portion of the adhesive affixation parts (14), which substantially provides the separation function. Since FIG. 3 shows the hollow fibers inside the separation function layer, the effective membrane area is calculated based on the total internal surface area of the hollow fibers. When the separation function layer is an externally arranged hollow fiber membrane (not illustrated), the effective membrane area is calculated based on the total outer surface area of the hollow fiber membrane.

Figure 4:
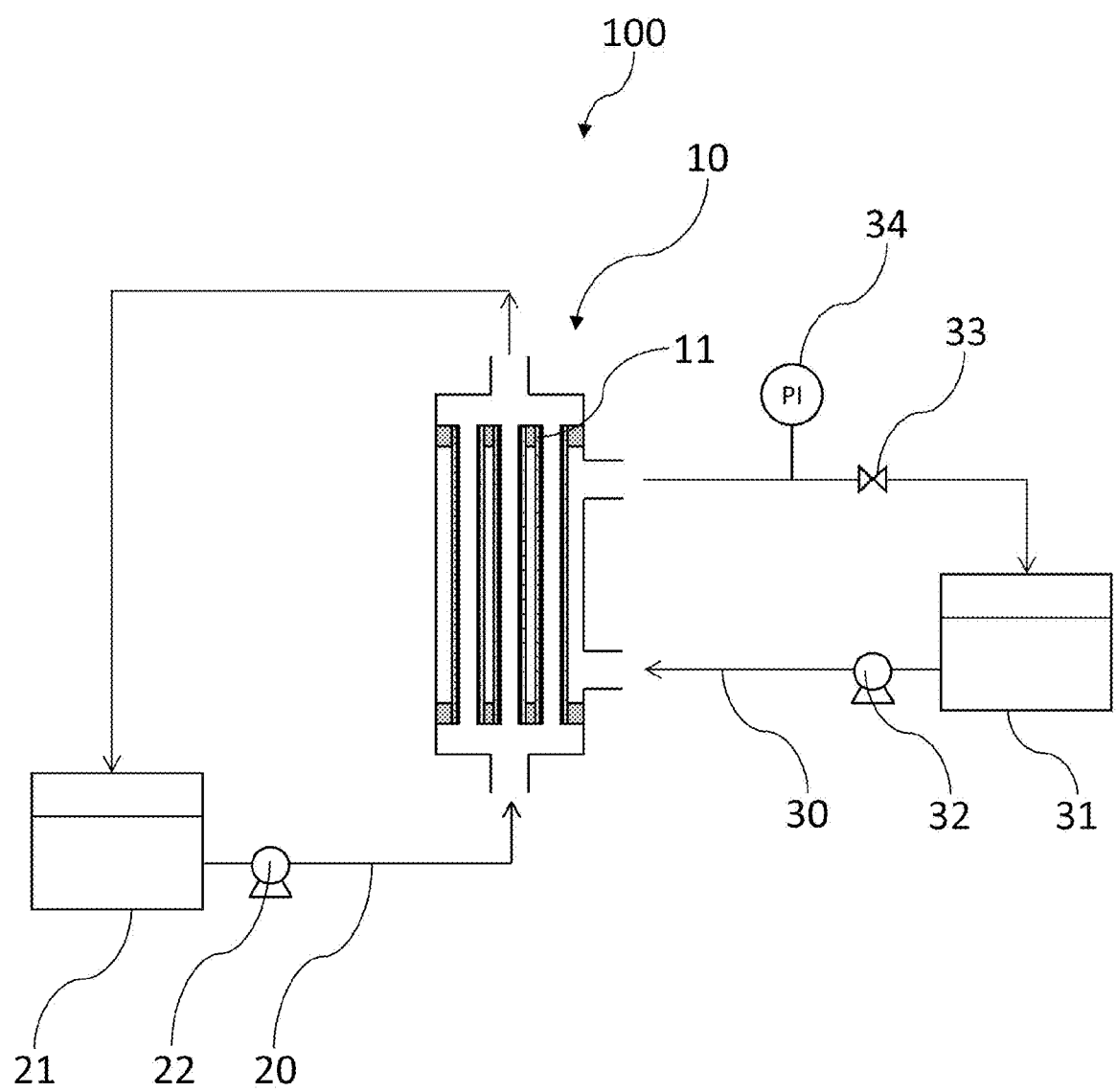
FIG. 4 is a schematic view showing an example of a method for evaluating a hollow fiber membrane module in which the evaluation device of the present disclosure is used.

FIG. 4 is a schematic view showing an example of a method for evaluating a hollow fiber membrane module using the evaluation device of the present disclosure. In FIG. 4, the forward osmosis membrane module (10) is the hollow fiber membrane module described in FIG. 3 above. The hollow fiber membrane module has a forward osmosis membrane (11) composed of hollow fibers composed of a porous support body and a separation function layer, and the space in the forward osmosis membrane module is partitioned into a space on the porous support body side and a space on the separation function layer side by the forward osmosis membrane. A feed solution line (20) and a draw solution line (30) are each prepared. The feed solution line (20) comprises a feed solution supply pump (22) as a feed solution supply means for fluid-supplying the feed solution from the feed solution tank (21) to the hollow fiber membrane module. The feed solution line (20) is fluid-connected to the space on the separation function layer side, and is configured so that the feed solution can be collected from the hollow fiber membrane module, returned to the feed solution tank, and circulated. The draw solution line (30) comprises a draw solution supply pump (32) as a draw solution supply means for fluid-supplying the draw solution from the draw solution tank (31) to the hollow fiber membrane module. The draw solution line (30) is fluid-connected to the space on the porous support body side, and is configured so that the draw solution can be collected from the hollow fiber membrane module, returned to the draw solution tank, and circulated. Furthermore, the draw solution line (30) comprises, in the line in which the draw solution is collected from the hollow fiber membrane module, a pressure regulation valve (33) as a pressure adjustment means for adjusting the physical pressure of the draw solution, and a pressure sensor (34) for measuring the physical pressure of the draw solution. The pressure regulation valve (33) and pressure sensor (34) are connected to a controller (not illustrated), and are configured to compare the physical pressure differential of the feed solution and the draw solution in real time, and adjust the physical pressure differential to be constant within a range of more than 0 kPa to 200 kPa, with a positive pressure on the porous support body side.

EXAMPLES

Measurement Methods

<Support Membrane Dimensions>

When the support membrane is a hollow fiber support membrane, the inner diameter, outer diameter, and membrane thickness are measured as the dimensions of the support membrane. In the case of a hollow fiber support membrane, the dimensions are measured using an optical micrograph (cross-sectional image) of a cross-section obtained by cutting in a plane perpendicular to the membrane surface direction (longitudinal direction). The outer diameter and inner diameter of this cross-sectional image are measured with a scale. Furthermore, the membrane thickness is calculated by dividing the difference between the outer diameter and the inner diameter by two. The outer diameter and the inner diameter referred to herein are the outer diameter and the inner diameter of the hollow fibers, respectively. In principle, the inner diameter, outer diameter, and membrane thickness of the support membrane should be measured only with the hollow fiber support membrane. However, the values measured in the state of the forward osmosis membrane (the state of having the separation function layer on the inner surface of the hollow fiber support membrane) may be substituted. It has been confirmed that values measured in the state of a forward osmosis membrane differ by less than a margin of error from those measured only in the state of hollow fiber support membrane and are substantially the same.

Forward Osmosis Membrane Production Examples

Production Example 1

Production of Hollow-Fiber Support Membrane:

As a spinning stock solution, a homogenous polymer solution composed of 19 wt % of polysulfone (manufactured by Solvay Specialty polymers, Udel-P3500), 61 wt % of N-methyl-2-pyrrolidone (manufactured by Fuji Film Wako Pure Chemical Industries, Ltd.), and 20 wt % of tetraethylene glycol (manufactured by Tokyo Kasei Co., Ltd.) was prepared. The stock solution was filled in a wet hollow fiber spinning machine equipped with a double spinneret. The stock solution at 40° C. and an internal coagulation liquid (water) at 25° C. were discharged from the double spinneret, and the mixture travelled 250 mm in air having a temperature controlled at 30° C. and a relative humidity of 98%. It was then coagulated in a coagulation bath (external coagulation liquid) filled with water at 30° C., and was wound with a tension of 20 g using a free roller as a turning roller to obtain a hollow fiber support membrane. The obtained hollow fiber support membrane had an outer diameter of 1.02 mm, an inner diameter of 0.62 mm, and a membrane thickness of 0.20 mm.

Production of Support Membrane Module:

130 hollow fiber support membranes were cut to 120 mm, filled in a cylindrical plastic housing having a diameter of 20 mm and a length of 100 mm, both ends thereof were affixed with an adhesive, and then cut to open the end faces thereof, whereby a support membrane module having an effective length of 80 mm and an effective surface area of 0.02 m² was prepared.

Formation of Separation Function Layer:

An aqueous solution (first solution) containing 2.0 wt % of m-phenylenediamine and 0.15 wt % of sodium lauryl sulfate was passed through the interior of the hollow fibers of the support membrane module for 20 minutes. After liquid flow was completed, the first solution was withdrawn from a pipe at the bottom of the module by the force of gravity. Subsequently, while the interior of the hollow fibers was wetted with the first solution, the outer portion of the support membrane module was depressurized to 90 kPaG and maintained in a depressurized state for 1 minute. Thereafter, air was flowed inside the hollow fibers for 1 minute to remove the excess first solution. Next, an n-hexane solution (second solution) containing 0.20 wt % of trimesic acid chloride was passed through the interior of the hollow fibers for 2 minutes to carry out interfacial polymerization, whereby a separation function layer was formed on the inner surfaces of the hollow fibers. The excess second solution was then removed by flowing nitrogen gas, and hot water at 85° C. was then flowed inside the hollow fibers for 30 minutes. Thereafter, the module was placed in an autoclave (SX-500 manufactured by Tomy Seiko Co., Ltd.) in an open state inside and outside, and the supply of high-temperature steam at 121° C. was continued for 20 minutes. The inside of the hollow fibers was washed with water at 20° C. for 30 minutes to obtain a forward osmosis membrane module.

Production Example 2

Production of Hollow Fiber Support Membrane:

As a spinning stock solution, a homogenous polymer solution composed of 18 wt % of polyether sulfone (manufactured by BASF, Ultrason E2020PSR) having hydroxylated terminals, and 80 wt % of N,N-dimethylacetamide (manufactured by Fuji Film Wako Pure Chemical Industries, Ltd.) was prepared. The stock solution was filled in a wet hollow fiber spinning machine equipped with a double spinneret. The stock solution at 40° C. and an internal coagulation liquid at 45° C. were discharged from the double spinneret, and the mixture travelled 200 mm in air having a temperature controlled at 30° C. and a relative humidity of 98%. It was then coagulated in a coagulation bath (external coagulation liquid) filled with water at 50° C., and was wound with a tension of 10 g using a free roller as a turning roller to obtain a hollow fiber support membrane. At this time, a solution composed of 50 wt % of water and 50 wt % of tetraethylene glycol was used as the internal coagulation liquid. The obtained hollow fiber support membrane had an outer diameter of 1.00 mm, an inner diameter of 0.70 mm, and a membrane thickness of 0.15 mm.

Production of Support Membrane Module and Formation of Separation Function Layer:

A forward osmosis membrane module was produced in the same manner as Example 1 except that the hollow-fiber support membrane described above was used.

Production Example 3

A forward osmosis membrane module was produced in the same manner as Production Example 1 except that in the formation of the separation function layer, processing by autoclave was not performed.

It should be noted that it was found that Production Example 1 was a method in which a forward osmosis membrane module having high performance could stably be obtained, Production Example 2 was a method in which a forward osmosis membrane module having high performance could be obtained in an unstable manner, and Production Example 3 was a method in which a forward osmosis membrane module having intermediate performance could stably be obtained. In the present embodiment, high performance means that the RSF/Flux value at an intermembrane differential pressure of 20 kPa (high pressure on the draw solution side) was 0.04 g/L (g/kg) or less in a basic performance evaluation, low performance means that the value of RSF/Flux was 0.08 g/L (g/kg) or more, and intermediate performance means that the value of RSF/Flux exceeded 0.04 g/L (g/kg) but was less than 0.08 g/L (g/kg).

Forward Osmosis Membrane Evaluation Device

Though the example of a device which is capable of constituting the forward osmosis membrane evaluation device is shown below, the present invention is not bound by the following device example.
  Chiller for temperature control: NCC-3000C (Tokyo Science Instruments Co., Ltd.), temperature control range −10 to 80° C.
  Double tube heat exchanger: HEX-MHE-20A-200-T (MDI Co., Ltd.), all titanium
  Pump: GJ series (Sanwa Tsusho Co., Ltd.), magnet gear pump
  Pressure sensor: GP-M series (GP-M010T) (KEYENCE Co., Ltd.)
  Flow rate sensor: FD-X series (FD-XS8) (KEYENCE Co., Ltd.)
  Balance: EA715CA-22 (A & D)
  Conductivity sensor: DS70 series (HORIBA, Ltd.), in-line type
  Refractive index sensor: L-Rix series (L-Rix 5200) (Anton Pearl), in-line type
  Temperature sensor: in-line temperature sensor L type (Toho Denshi Co., Ltd.)
  Back pressure valve: 44-2300 series (Tescom Co., Ltd.), degree of opening and closing is controlled by a motor
  Data logger: GL840 series (Graphtec Corporation)

Examples 1 to 20, Comparative Examples 1 to 4, and Reference Example 1

The forward osmosis membrane evaluation device was configured as follows using each of the above devices. First, a feed solution tank and a feed solution line which connects the feed solution tank to the forward osmosis membrane module were prepared. The feed solution tank and the draw solution tank have the above balance under them. The balance can measure the weight change of the feed solution and the draw solution tank, and can measure the water permeability based on the weight change of the feed solution. The pump for supplying the feed solution from the feed solution tank to the forward osmosis membrane module created in the production example, and the flow rate meter for measuring the flow rate of the feed solution were installed in the feed solution line. The feed solution line had a bypass line which allows the feed solution to be circulated in advance prior to connection to the forward osmosis membrane module. Furthermore, one pressure sensor for measuring the physical pressure of the feed solution was installed on each of the inlet side and the outlet side of the module in the feed solution line. The heat medium of the temperature control chiller was connected so as to enter the double tube heat exchanger, and the inside of the double tube heat exchanger was arranged so that the feed solution line could flow. A thermometer for measuring the temperature of the feed solution was installed in the feed solution line coming from the double tube heat exchanger. As a result, the feed solution can be temperature adjusted before entering the forward osmosis membrane module. The flow of feed solution exits the feed solution tank and passes through the pump, flow rate meter, pressure gauge (inlet side pressure), heat exchanger, thermometer, forward osmosis membrane module, and pressure gauge (outlet side pressure) in this order, and then flows back to the feed solution tank. A draw solution tank and a draw solution line which connects the draw solution tank to the forward osmosis membrane module were prepared. The draw solution line had a bypass line which allows the draw solution to be circulated in advance prior to connection to the forward osmosis membrane module. The pump which supplies the draw solution from the draw solution tank to the forward osmosis membrane module and the flow rate meter for measuring the flow rate of the draw solution were installed in the draw solution line. The back pressure valve was installed in the draw solution line to physically pressurize the draw solution and adjust the physical pressure differential of the feed solution and the draw solution. Furthermore, one pressure sensor for measuring the physical pressure of the draw solution was installed on each of the inlet side and the outlet side of the module in the draw solution line. The heat medium of the temperature control chiller was connected so as to enter the double tube heat exchanger, and the inside of the double tube heat exchanger was arranged so that the feed solution line and the draw solution line could flow. A thermometer for measuring the temperature of the draw solution was installed in the draw solution line coming from the double tube heat exchanger. As a result, the draw solution can be temperature adjusted before entering the forward osmosis membrane module. The flow of draw solution exits the draw solution tank, pump, flow rate meter, pressure gauge (inlet side pressure), heat exchanger, thermometer, forward osmosis membrane module, pressure gauge (outlet side pressure), and back pressure valve in this order, and then flows back to the draw solution tank. This forward osmosis membrane evaluation device was used for the basic performance evaluation of the forward osmosis membranes of Examples 1 to 20, Comparative Examples 1 to 4, and Reference Example 1 described below.

Basic Performance Evaluation of Forward Osmosis Membrane

Regarding the forward osmosis membranes obtained in Production Examples 1 to 3, after performing forward osmosis operations under the following conditions, the water permeability (Flux) and the salt back diffusion amount (RSF) were determined, and the salt permeability (RSF/Flux) was calculated.
  Feed solution: purified water, 25° C., flow rate approx. 88 mL/min (line speed approx. 3.7 cm/sec, residence time approx. 2 seconds), solution amount 3 L
  Draw solution: 3.5 wt % sodium chloride aqueous solution, 25° C., flow rate 390 mL/min (line speed approx. 3.7 cm/sec, residence time approx. 2 seconds), solution amount 3 L
  Physical pressure differential: 20 kPa, circulated in advance in the bypass line, and adjust with a back pressure valve on the draw solution side
  Temperature: adjusted in advance using a double-tube heat exchanger and a temperature control chiller
  Operation time: 20 minutes from start of liquid flow from feed solution, passing draw solution, and after the draw solution is first discharged from the module However, in Example 7, the temperature of the feed solution was adjusted to 15° C., and the temperature of the draw solution was adjusted to 30° C.

The forward osmosis operation was carried out by adding a saturated sodium chloride aqueous solution to the draw solution and maintaining the concentration of the draw solution constant. The intermembrane differential pressure was set so that the draw solution side (support membrane side of the forward osmosis membrane) was positive (high pressure) by operating the back pressure valve on the draw solution side. Each measurement was performed once for each of the five modules produced by the same production method. However, for Reference Example 1, one module produced in the same manner as in Example 1 was evaluated 5 times. In Examples 19 and 20, and Comparative Example 4, two types of modules having different production methods were prepared, three from one method and two from the other, for a total of five, and each was measured once. The average value and standard deviation were calculated from the obtained five RSF/Flux values, and the coefficient of variation was calculated by dividing the standard deviation by the average value and shown as a percentage.

Examples 21 and 22

For Examples 21 and 22, a forward osmosis membrane device having the following configuration was used in the basic performance evaluation of the forward osmosis membrane. First, a feed solution tank and a feed solution line which connects the feed solution tank to the forward osmosis membrane module were prepared. The feed solution tank and the draw solution tank have the above balance under them. The balance can measure the weight change of the feed solution and the draw solution tank, and can measure the water permeability based on the weight change of the feed solution. The pump for supplying the feed solution from the feed solution tank to the forward osmosis membrane module created in the production example, and the flow rate meter for measuring the flow rate of the feed solution were installed in the feed solution line. The feed solution line had a bypass line which allows the feed solution to be circulated in advance prior to connection to the forward osmosis membrane module. Further, one pressure sensor for measuring the physical pressure of the feed solution was installed on each of the inlet side and the outlet side of the module in the feed solution line. Furthermore, one conductivity sensor for measuring the conductivity of the feed solution was installed on each of the inlet side and the outlet side of the module in the feed solution line. The heat medium of the temperature control chiller was connected so as to enter the double tube heat exchanger, and the inside of the double tube heat exchanger was arranged so that the feed solution line could flow. A thermometer for measuring the temperature of the feed solution was installed in the feed solution line coming from the double tube heat exchanger. As a result, the feed solution can be temperature adjusted before entering the forward osmosis membrane module. The flow of feed solution exits the feed solution tank and passes through the pump, flow rate meter, conductivity meter (inlet side conductivity), pressure gauge (inlet side pressure), heat exchanger, thermometer, forward osmosis membrane module, pressure gauge (outlet side pressure), and conductivity meter (outlet side conductivity) in this order, and then, instead of returning to the feed solution tank, a one-pass flow in which it is collected in another tank is performed. A balance was installed under the other tank, and the weight of the feed solution exiting with one pass was measured. A draw solution tank and a draw solution line which connects the draw solution tank to the forward osmosis membrane module were prepared. The draw solution line had a bypass line which allows the draw solution to be circulated in advance prior to connection to the forward osmosis membrane module. The pump which supplies the draw solution from the draw solution tank to the forward osmosis membrane module and the flow rate meter for measuring the flow rate of the draw solution were installed in the draw solution line. The back pressure valve was installed in the draw solution line to physically pressurize the draw solution and adjust the physical pressure differential of the feed solution and the draw solution. Furthermore, one pressure sensor for measuring the physical pressure of the draw solution was installed on each of the inlet side and the outlet side of the module in the draw solution line. The heat medium of the temperature control chiller was connected so as to enter the double tube heat exchanger, and the inside of the double tube heat exchanger was arranged so that the feed solution line and the draw solution line could flow. A thermometer for measuring the temperature of the draw solution was installed in the draw solution line coming from the double tube heat exchanger. As a result, the draw solution can be temperature adjusted before entering the forward osmosis membrane module. The flow of draw solution exits the draw solution tank, pump, flow rate meter, pressure gauge (inlet side pressure), heat exchanger, thermometer, forward osmosis membrane module, pressure gauge (outlet side pressure), and back pressure valve in this order, and then flows back to the draw solution tank.

Regarding Examples 21 and 22, the feed solution was one-pass flowed, and the RSF was calculated by measuring the conductivity and weight of the feed solution discharged from the forward osmosis membrane module. Furthermore, the Flux was calculated based on the amount of weight increase of the draw solution. The draw solution was circulated and pressurized in the forward osmosis membrane module in advance, and the feed solution was then passed therethrough and evaluated. Regarding Example 21, the time when the feed solution started to be discharged from the forward osmosis membrane module was set to 0 seconds, and the data after 30 seconds as the stabilization time was used for evaluation. Regarding Example 22, no stabilization time was provided, and when the feed solution was discharged from the forward osmosis membrane module and measurement became possible, the data from this time was used for evaluation. Furthermore, evaluation was carried out in the same manner as in Example 1 except that the flow rate of the feed solution was one-pass at approximately 30 mL/min, the flow rate of the draw solution was set to circulate at approximately 100 mL/min, and the other conditions were set as described in the table. The time required for the evaluation interval including device cleaning after evaluation and concentration adjustment of the feed solution was 10 minutes or more in Example 1, whereas it was within approximately 2 minutes in Examples 21 and 22.

In the case of inorganic salt, the RSF was calculated using a calibration curve prepared in advance and calculating the weight of the draw solute transferred from the draw solution side to the feed solution side from the value of the electrical conductivity measured by the conductivity meter. When there were a plurality of components involved in conductivity, the amount of cations ionized from the draw solute to be measured was determined in the same manner by continuously measuring using an ICP-MS (inductively-coupled high-frequency plasma mass spectrometry) device manufactured by Thermo Fisher Scientific, format name "iCAP Q." For example, in Reference Example 1, it was calculated by measuring Na+. In Example 17, the RSF measurement target was calculated by measuring the Na+ of NaCl. In the case of organic matter, the RSF was calculated using a calibration curve prepared in advance and calculating the weight of the draw solute transferred from the draw solution side to the feed solution side from the area value of each peak measured by gas chromatography measurement. The performance of the forward osmosis membrane depends on the intermembrane differential pressure, and the higher the pressure on the draw solution side, the greater the amount of salt transferred from the draw solution to the feed solution. This is because so-called "reverse osmosis treatment", in which pressure is applied against the difference in osmotic pressure, is applied at the same time as the forward osmosis treatment in the opposite direction.

<Mock Solution Operation>

Next, in order to confirm the practical performance of the forward osmosis membranes obtained in Production Examples 1 to 3, forward osmosis treatment was performed under the following conditions. After the basic performance evaluation of the forward osmosis membrane module, the forward osmosis membrane module was washed with water for 5 hours or more, and the following mock solution was concentrated five-fold. Measurement was performed once for each of the five modules, for a total of five times. However, for Reference Example 1, one module was evaluated five times.

Feed solution: magnesium chloride was added to a 20 wt % sucrose aqueous solution and diluted so that the $Mg^{2+}$ ion concentration in the solution was 60 weight ppm to prepare a mock solution. Initial temperature 20° C., flow rate approximately 88 mL/min (line speed approximately 3.7 cm/sec, residence time approximately 2 seconds), solution amount 10 L Draw solution: 30 wt % magnesium chloride aqueous solution, initial temperature 25° C., flow rate 390 mL/min (line speed approximately 3.7 cm/sec, residence time approximately 2 seconds), solution amount 10 L Physical pressure differential: no adjustment or disturbance. However, by sending the feed solution and draw solution with a tube pump, pulsation occurred and pressure fluctuation is added accordingly. The physical pressure differential changed over time because the pressure exerted by the pulsation also depends on the viscosity of the solution.

Temperature: no adjustment or disturbance, external environmental temperature 25° C.

Operation time: a scale was set on the feed solution side and draw solution tank so that the internal liquid level could be calculated in advance, and the amount of water movement was measured from the transition of the liquid level of the feed solution tank. The amount of water transferred from the feed solution to the draw solution was calculated, the operation was stopped when the concentration progressed approximately five-fold (when the feed solution reached 2 L), and the amounts of water and each salt transferred were measured.

The draw solution to be diluted was set so as to maintain the initial concentration by adding a draw solution having a saturated concentration little by little during measurement, and measurement was performed at 25° C. To calculate the amount of salt transfer, the amount of cations ($Mg^{2+}$ ions derived from magnesium chloride, which is the solute of the draw solution) was measured using an inductively coupled plasma-mass spectrometer (ICP-MS) manufactured by Thermo Fisher Scientific, using the format "iCAP Q."

Mg Concentration Evaluation after Mock Solution Concentration: Practical Variation Evaluation As a guideline for practical variation evaluation, after concentrating the mock solution with five modules each (1 module×5 times in Reference Example 1), the difference between the maximum and minimum values of $Mg^{2+}$ ion concentration diffused from the draw solution to the feed solution, i.e., the difference between the result showing the highest value and the result showing the lowest value among the five modules (five measurements in Reference Example 1) was obtained and evaluated according to the following criteria A to C. The results are shown in Table 1.

A: When the difference between the maximum and minimum values of $Mg^{2+}$ ion concentration in the concentrated feed solution is less than 100 weight ppm B: When the difference between the maximum and minimum values of $Mg^{2+}$ ion concentration in the concentrated feed solution is 100 weight ppm to less than 500 weight ppm C: When the difference between the maximum and minimum values of $Mg^{2+}$ ion concentration in the concentrated feed solution is 500 weight ppm or more <Judgment of Evaluation Accuracy>

Evaluation accuracy was evaluated from the basic performance evaluation results of the forward osmosis membranes and the results of practical variability in the mock solution operation. When the basic performance evaluation results of the forward osmosis membrane module accurately evaluated the practical performance of the forward osmosis membrane, the variation in the mock solution tended to be low (evaluation A) in the case of 20% or less as the RSF/Flux coefficient of variation of the basic performance evaluation results, there was some variation in the mock solution (evaluation B) in the case of 20% to 40%, and there should be a tendency for the mock solution to have a large variation (evaluation C) in the case of more than 40%. Thus, those in line with this tendency were regarded as good accuracy (B), and among them, those in which the RSF/Flux coefficient of variation of the basic performance evaluation results was 10% or less and the performance could be evaluated better were regarded as excellent in accuracy (A). Those that did not meet this tendency were regarded as poor accuracy (C).

The measurement and evaluation results are listed in Tables 1 to 4 below. The abbreviations in the table are as follows.

FS: feed solution
DS: draw solution
NaCl: sodium chloride (aqueous solution)
$MgCl_2$: magnesium chloride (aqueous solution)
$MgSO_4$: magnesium sulfate (aqueous solution)
IPA: isopropyl alcohol (aqueous solution)
MeCN: acetonitrile

TABLE 1

Basic Performance Evaluation Conditions

| | Forward Osmosis Membrane | Module no/ measurement reps | FS | DS | FS pressure [kPa] | DS pressure [kPa] | Measurement time [min] | Advance DS pressure adj | Temp adj | Advance flow rate adj | Permeation order |
|---|---|---|---|---|---|---|---|---|---|---|---|
| Ex 1 | Prod Ex 1 | 5 module × 1 rep | Water | 3.5 wt % NaCl | 0 | 20 | 20 | Yes | Yes | Yes | FS⇒DS |
| Ex 2 | Prod Ex 1 | 5 module × 1 rep | Water | 3.5 wt % NaCl | 0 | 20 | 60 | Yes | Yes | Yes | FS⇒DS |
| Ex 3 | Prod Ex 1 | 5 module × 1 rep | Water | 3.5 wt % NaCl | 0 | 20 | 5 | Yes | Yes | Yes | FS⇒DS |
| Ex 4 | Prod Ex 1 | 5 module × 1 rep | Water | 3.5 wt % NaCl | 0 | 200 | 20 | Yes | Yes | Yes | FS⇒DS |
| Ex 5 | Prod Ex 2 | 5 module × 1 rep | Water | 3.5 wt % NaCl | 0 | 20 | 20 | Yes | Yes | Yes | FS⇒DS |
| Ex 6 | Prod Ex 3 | 5 module × 1 rep | Water | 3.5 wt % NaCl | 0 | 20 | 20 | Yes | Yes | Yes | FS⇒DS |
| Ex 7 | Prod Ex 1 | 5 module × 1 rep | Water | 3.5 wt % NaCl | 0 | 20 | 20 | Yes | No | Yes | FS⇒DS |
| Ex 8 | Prod Ex 1 | 5 module × 1 rep | Water | 3.5 wt % NaCl | 0 | 20 | 20 | Yes | Yes | No | FS⇒DS |
| Ex 9 | Prod Ex 1 | 5 module × 1 rep | Water | 3.5 wt % NaCl | 0 | 20 | 20 | Yes | Yes | Yes | DS⇒FS |
| Ex 10 | Prod Ex 1 | 5 module × 1 rep | Water | 3.5 wt % NaCl | 0 | 20 | 20 | Yes | Yes | Yes | Simultaneous |
| Ex 11 | Prod Ex 1 | 5 module × 1 rep | Water | 5.0 wt % $MgCl_2$ | 0 | 20 | 20 | Yes | Yes | Yes | FS⇒DS |
| Ex 12 | Prod Ex 1 | 5 module × 1 rep | Water | 5.0 wt % $MgSO_4$ | 0 | 20 | 20 | Yes | Yes | Yes | FS⇒DS |

TABLE 2

Basic Performance Evaluation Conditions

| | Forward Membrane Osmosis | Module no/ measurement reps | FS | DS | FS pressure [kPa] | DS pressure [kPa] | Measurement time [min] | Advance DS pressure adj | Temp adj | Advance flow rate adj | Permeation order |
|---|---|---|---|---|---|---|---|---|---|---|---|
| Ex 13 | Prod Ex 1 | 5 module × 1 rep | Water | 50 wt % IPA | 0 | 20 | 20 | Yes | Yes | Yes | FS⇒DS |
| Ex 14 | Prod Ex 1 | 5 module × 1 rep | Water | 0.7 wt % NaCl | 0 | 20 | 20 | Yes | Yes | Yes | FS⇒DS |
| Ex 15 | Prod Ex 1 | 5 module × 1 rep | Water | 100 wt % MeCN | 0 | 20 | 20 | Yes | Yes | Yes | FS⇒DS |
| Ex 16 | Prod Ex 1 | 5 module × 1 rep | Water | 3.5 wt % NaCl | 0 | 20 | 20 | No | Yes | Yes | FS⇒DS |
| Ex 17 | Prod Ex 1 | 5 module × 1 rep | Water | 2.0 wt % NaCl + 2.0 wt % $MgCl_2$ | 0 | 20 | 20 | Yes | Yes | Yes | FS⇒DS |
| Ex 18 | Prod Ex 1 | 5 module × 1 rep | Water | 3.5 wt % NaCl | 50 | 100 | 20 | Yes | Yes | Yes | FS⇒DS |
| Ex 19 | Prod Ex 1 + 2 | 3 module + 2 module × 1 rep | Water | 3.5 wt % NaCl | 0 | 20 | 20 | Yes | Yes | Yes | FS⇒DS |
| Ex 20 | Prod Ex 1 + 3 | 3 module + 2 module × 1 rep | Water | 3.5 wt % NaCl | 0 | 20 | 20 | Yes | Yes | Yes | FS⇒DS |
| Comp Ex 1 | Prod Ex 2 | 5 module × 1 rep | Water | 3.5 wt % NaCl | 0 | 0 | 20 | Yes | Yes | Yes | FS⇒DS |
| Comp Ex 2 | Prod Ex 2 | 5 module × 1 rep | Water | 3.5 wt % NaCl | 20 | 0 | 20 | No | Yes | Yes | FS⇒DS |
| Comp Ex 3 | Prod Ex 1 | 5 module × 1 rep | Water | 3.5 wt % NaCl | 0 | 350 | 20 | Yes | Yes | Yes | FS⇒DS |
| Comp Ex 4 | Prod Ex 1 + 2 | 3 module + 2 module × 1 rep | Water | 3.5 wt % NaCl | 0 | 0 | 20 | Yes | Yes | Yes | FS⇒DS |
| Ref Ex 1 | Prod Ex 1 | 1 module × 5 rep | Water | 3.5 wt % NaCl | 0 | 20 | 20 | Yes | Yes | Yes | FS⇒DS |
| Ex 21 | Prod Ex 1 | 5 module × 1 rep* | Water | 3.5 wt % NaCl | 0 | 20 | 5 | Yes | Yes | Yes | DS⇒FS |
| Ex 22 | Prod Ex 1 | 5 module × 1 rep* | Water | 3.5 wt % NaCl | 0 | 20 | 5 | Yes | Yes | Yes | DS⇒FS |

*One-pass evaluation

TABLE 3

| | Basic Performance Evaluation Results | | | Evaluation | |
|---|---|---|---|---|---|
| | RSF/Flux avg val [g/kg] | RSF/Flux Standard Dev [g/kg] | RSF/Flux Variation Coeff [%] | Mock solution operation variation evaluation | Evaluation accuracy |
| Ex 1 | 0.025 | 0.0018 | 7.391 | A | A |
| Ex 2 | 0.024 | 0.0014 | 5.893 | A | A |
| Ex 3 | 0.025 | 0.0026 | 10.328 | A | B |
| Ex 4 | 0.104 | 0.0105 | 10.075 | A | B |
| Ex 5 | 0.051 | 0.0303 | 58.916 | C | B |
| Ex 6 | 0.050 | 0.0048 | 9.441 | A | A |
| Ex 7 | 0.024 | 0.0031 | 12.856 | A | B |
| Ex 8 | 0.024 | 0.0043 | 17.873 | A | B |
| Ex 9 | 0.026 | 0.0034 | 13.034 | A | B |

TABLE 3-continued

| | Basic Performance Evaluation Results | | | Evaluation | |
|---|---|---|---|---|---|
| | RSF/Flux avg val [g/kg] | RSF/Flux Standard Dev [g/kg] | RSF/Flux Variation Coeff [%] | Mock solution operation variation evaluation | Evaluation accuracy |
| Ex 10 | 0.025 | 0.0028 | 11.027 | A | B |
| Ex 11 | 0.003 | 0.0005 | 14.409 | A | B |
| Ex 12 | 0.002 | 0.0004 | 18.050 | A | B |

TABLE 4

| | Basic Performance Evaluation Results | | | Evaluation | |
|---|---|---|---|---|---|
| | RSF/Flux avg val [g/kg] | RSF/Flux Standard Dev [g/kg] | RSF/Flux Variation Coeff [%] | Mock solution operation variation evaluation | Evaluation accuracy |
| Ex 13 | 2.760 | 0.2417 | 8.756 | A | A |
| Ex 14 | 0.020 | 0.0025 | 12.245 | A | B |
| Ex 15 | 7.880 | 1.3227 | 16.786 | A | B |
| Ex 16 | 0.024 | 0.0035 | 14.891 | A | B |
| Ex 17 | 0.017 | 0.0034 | 19.775 | A | B |
| Ex 18 | 0.034 | 0.0066 | 19.571 | A | B |
| Ex 19 | 0.046 | 0.0274 | 59.519 | C | B |
| Ex 20 | 0.033 | 0.0121 | 36.207 | B | B |
| Comp Ex 1 | 0.021 | 0.002 | 9.147 | C | C |
| Comp Ex 2 | 0.019 | 0.001 | 7.655 | C | C |
| Comp Ex 3 | 2.152 | 0.750 | 34.866 | A | C |
| Comp Ex 4 | 0.021 | 0.0028 | 13.140 | C | C |
| Ref Ex 1 | 0.024 | 0.0009 | 3.727 | A | A |
| Ex 21 | 0.025 | 0.0023 | 9.481 | A | A |
| Ex 22 | 0.029 | 0.0041 | 14.134 | A | B |

As shown in Tables 3 and 4, in the evaluation method of the Examples, the practical performance of the forward osmosis membranes could be evaluated with high accuracy. In the evaluation method of Comparative Example 1, the pressure of the draw solution was normal pressure (0 kPa), whereby evaluation could not be performed accurately. In the evaluation method of Comparative Example 2, the pressure of the draw solution was normal pressure (0 kPa) and the feed solution was pressurized (20 kPa), but evaluation could not be performed accurately. In the evaluation method of Comparative Example 3, the pressure of the draw solution was as high as 350 kPa, and thus, it is considered that thereby the separation function layer was peeled off or destroyed. Reference example 1 is an example in which variations due to individual differences in modules are eliminated by repeatedly measuring the same module, and in the evaluation method of the present disclosure, it is shown that the coefficient of variation is small and the evaluation accuracy is high in the performance evaluation.

INDUSTRIAL APPLICABILITY

The evaluation method and evaluation device of the present disclosure can be applied to the measurement of the practical performance of a forward osmosis membrane, and in particular, can be suitably applied to the measurement of the practical performance of a forward osmosis membrane having a support membrane and a separation function layer.

REFERENCE SIGNS LIST 10 forward osmosis membrane module
10a space on porous support body side
10b space on separation function layer side
11 forward osmosis membrane
11a porous support body
11b separation function layer
12 inner conduit
13 outer conduit
14 adhesive affixation part
15 effective membrane area portion
20 feed solution line
21 feed solution tank
22 feed solution supply pump
30 draw solution line
31 draw solution tank
32 draw solution supply pump
33 pressure regulation valve
34 pressure sensor
100 evaluation system for forward osmosis membrane module
P1 solvent movement direction
P2 physical pressure application direction

The invention claimed is:

1. A method for evaluating a forward osmosis membrane module having spaces partitioned by a forward osmosis membrane, wherein
the forward osmosis membrane has a support membrane comprising a porous support body, and a separation function layer provided on the support body, the method comprising the steps of:
preparing a feed solution line for sending a feed solution containing a solvent to the forward osmosis membrane module, and a draw solution line for sending a draw solution having an osmotic pressure higher than the feed solution to the forward osmosis membrane module, connecting the feed solution line to, among the spaces of the forward osmosis membrane module, a space on the separation function layer side, and connecting the draw solution line to a space on the porous support body side, and flowing the feed solution and the draw solution countercurrently or concurrently via the forward osmosis membrane to move the solvent in the feed solution into the draw solution while adjusting the physical pressure differential across the forward osmosis membrane to a constant value within the range of more than 0 kPa to 200 kPa, with a positive pressure on the porous support body side.

2. The method according to claim 1, further comprising, prior to connecting the forward osmosis membrane module to the feed solution line and the draw solution line, adjusting a physical pressure of the draw solution to more than 0 kPa to 200 kPa while circulating the draw solution outside of the forward osmosis membrane module.

3. The method according to claim 1, wherein the physical pressure differential is 20 kPa to 100 kPa.

4. The method according to claim 1, further comprising, prior to connecting the forward osmosis membrane module to the feed solution line and the draw solution line, adjusting a temperature differential of the feed solution and the draw solution to within 10° C.

5. The method according to claim 1, further comprising, prior to connecting the forward osmosis membrane module to the feed solution line and the draw solution line, adjusting flow rates of the feed solution and the draw solution to adjust a difference between a residence time of the feed solution in the space on the separation function layer side and a residence time of the draw solution in the space on the porous support body side after connection of the forward osmosis membrane module to 20 seconds or less.

6. The method according to claim 1, wherein the solvent is water.

7. The method according to claim 6, wherein the draw solution is supplied after the feed solution has been supplied to the forward osmosis membrane module.

8. The method according to claim 1, wherein a solution containing the feed solution after having been supplied to the forward osmosis membrane module and discharged from the forward osmosis membrane module is not returned to a feed solution tank.

9. The method according to claim 8, wherein performance of the forward osmosis membrane is evaluated by measuring at least one difference selected from the group consisting of conductivity, refractive index, total organic carbon, chemical oxygen demand, biochemical oxygen demand, absorbance, and transmittance between the feed solution and a solution containing the feed solution after having been supplied to the forward osmosis membrane module and discharged from the forward osmosis membrane module, and comparing the difference with that of the draw solution.

10. The method according to claim 8, wherein evaluation is started 10 seconds after the feed solution is first discharged from the forward osmosis membrane module.

11. The method according to claim 1, wherein a draw solute contained in the draw solution is at least one selected from an inorganic salt and a hydrophilic organic compound.

12. The method according to claim 11, wherein a number average molecular weight of the draw solute is 20 to 300.

13. The method according to claim 11, wherein the draw solute comprises a monovalent salt.

14. The method according to claim 11, wherein the draw solute is a $C_{1-4}$ alcohol or acetonitrile.

15. The method according to claim 11, wherein a concentration of the draw solute is 1 wt % or more relative to the total weight of the draw solution.

16. The method according to claim 1, wherein the forward osmosis membrane module is a hollow fiber membrane module.

17. An evaluation device for a forward osmosis membrane module having a forward osmosis membrane, the device comprising:

a feed solution tank in which a feed solution is stored, a feed solution line for connecting the feed solution tank to the forward osmosis membrane module, a feed solution supply means for supplying the feed solution from the feed solution tank to the forward osmosis membrane module through the feed solution line, a draw solution tank in which a draw solution having an osmotic pressure higher than the feed solution is stored, a draw solution line for connecting the draw solution tank to the forward osmosis membrane module, a draw solution supply means for supplying the draw solution from the draw solution tank to the forward osmosis membrane module through the draw solution line, a pressure adjustment means which is installed in the draw solution line and which can physically pressurize the draw solution before, after, and during evaluation of the forward osmosis membrane module, the pressure adjustment means being configured to adjust a physical pressure differential of the draw solution relative to a physical pressure of the feed solution to a constant value within the range of more than 0 kPa to 200 kPa, and a pressure sensor which is installed in the draw solution line and which can measure the physical pressure of the draw solution.

18. The evaluation device according to claim 17, wherein the evaluation device is an evaluation device for a forward osmosis membrane module having a support membrane comprising a porous support body, and a forward osmosis membrane having a separation function layer provided on the porous support body.

19. The evaluation device according to claim 17, wherein the draw solution line has a circulation structure which can circulate the draw solution outside of the forward osmosis membrane module prior to connection to the forward osmosis membrane module, and comprises a draw solution bypass line which constitutes a part of the circulation structure of the draw solution line and which can be attached to and detached from the forward osmosis membrane module.

20. The evaluation device according to claim 17, wherein the feed solution line has a circulation structure which can circulate the feed solution outside of the forward osmosis membrane module prior to connection to the forward osmosis membrane module, and comprises a feed solution bypass line which constitutes a part of the circulate structure of the feed solution line and which can be attached to and detached from the forward osmosis membrane module.

21. The evaluation device according to claim 17, wherein at least one selected from a pressure adjustment means and a temperature adjustment means is provided in the feed solution line.

22. The evaluation device according to claim 17, further comprising a temperature adjustment means in the draw solution line.

23. The evaluation device according to claim 17, wherein at least one selected from the group consisting of a pressure sensor, a temperature sensor, a flow rate sensor, a conductivity sensor, and a refractive index sensor is provided in the feed solution line.

24. The evaluation device according to claim 17, wherein at least one selected from the group consisting of a pressure sensor, a temperature sensor, a flow rate sensor, a conductivity sensor, and a refractive index sensor is provided in the draw solution line.

25. The evaluation device according to claim 17, wherein the feed solution tank, the draw solution tank, or both comprise a temperature adjustment means.

26. The evaluation device according to claim 17, wherein the feed solution tank, the draw solution tank, or both comprise at least one selected from the group consisting of a temperature sensor, a conductivity sensor, and a refractive index sensor.

27. The evaluation device according to claim 17, wherein a plurality of sets of the feed solution line and the draw solution line are provided, and a plurality of forward osmosis membrane modules can be evaluated in parallel.

28. The evaluation device according to claim 17, wherein the evaluation device is configured to monitor the values measured by each of the provided sensors and time in real time and store the same in a database, and so as to be capable of detecting a difference between values of the feed solution, the draw solution, or both in solution circulation time before evaluation and values of the forward osmosis membrane module evaluation time.

29. The evaluation device according to claim 17, wherein a pressure adjustment means, a pressure sensor, and a flow rate sensor are provided in the feed solution line,
   a flow rate sensor is further provided in the draw solution line,
   the evaluation device further comprises a controller which is connected to the pressure sensor, the flow rate sensor, and the pressure adjustment means, as well as the feed solution supply means and the draw solution supply means, and
   the controller is configured to compare the physical pressure differential, flow rates, and minimum flow rates of the feed solution and the draw solution in real time, and is configured to control the pressure adjustment means, the feed solution supply means, and the draw solution supply means so as to maintain a desired physical pressure differential and flow rates which are equal to or greater than the minimum flow rates.

30. The evaluation device of claim 29, wherein the evaluation device is configured to maintain a real-time physical pressure differential to within ±1 kPa of the desired physical pressure differential.

31. The evaluation device according to claim 29, wherein the evaluation device is configured to be capable of determining, and controlling in advance, a pressure and flow rate of the draw solution prior to forward osmosis membrane module evaluation by inputting information regarding a surface area of a feed solution supply part and a draw solution supply part in the forward osmosis membrane module, a desired physical pressure differential, and a desired minimum flow rate of the feed solution.

32. The evaluation device according to claim 29, wherein the controller comprises a processor which is configured to execute a proportional integral differential control algorithm.

33. The evaluation device according to claim 17, wherein the draw solution line and/or the draw solution tank further comprises a concentration adjustment means which can perform at least one of removing solvent from the draw solution, adding high-concentration draw solution to the draw solution, or adding draw solute.

34. The evaluation device according to claim 17, wherein the forward osmosis membrane module is a hollow fiber membrane module.

\* \* \* \* \*